US012793326B2

(12) United States Patent
Eun et al.

(10) Patent No.: US 12,793,326 B2
(45) Date of Patent: Nov. 10, 2026

(54) WEARABLE DEVICE FOR CHANGING STATE OF SCREEN, AND METHOD THEREFOR

(71) Applicant: SAMSUNG ELECTRONICS CO., LTD., Suwon-si (KR)

(72) Inventors: Baul Eun, Suwon-si (KR); Jeongmin Park, Suwon-si (KR); Hanju Bae, Suwon-si (KR); Heeyoun Lee, Suwon-si (KR); Sungoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/186,119

(22) Filed: Apr. 22, 2025

(65) Prior Publication Data

US 2025/0252658 A1 Aug. 7, 2025

Related U.S. Application Data

(63) Continuation of application No. PCT/KR2023/015550, filed on Oct. 10, 2023.

(30) Foreign Application Priority Data

Oct. 28, 2022 (KR) ........................ 10-2022-0141918
Nov. 28, 2022 (KR) ........................ 10-2022-0161654

(51) Int. Cl.
*G06T 15/10* (2011.01)
*G06F 3/01* (2006.01)

(52) U.S. Cl.
CPC .............. *G06T 15/10* (2013.01); *G06F 3/013* (2013.01); *G06T 2200/24* (2013.01)

(58) Field of Classification Search
CPC .......... G06T 15/10; G06F 3/013; G06V 40/18
(Continued)

(56) References Cited

U.S. PATENT DOCUMENTS 11,024,263 B2 6/2021 Chhipa et al.
11,036,364 B2 6/2021 Zurmoehle et al.
(Continued)

FOREIGN PATENT DOCUMENTS

JP 2014514653 A * 6/2014 .............. G06F 3/011
JP 2018-88268 A 6/2018
(Continued)

OTHER PUBLICATIONS

International Search Report and Written Opinion (PCT/ISA/210 and PCT/ISA/237) dated Jan. 25, 2024, issued by International Searching Authority for International Application No. PCT/KR2023/015550.

(Continued)

*Primary Examiner* — Duane N Taylor, Jr.
(74) *Attorney, Agent, or Firm* — Sughrue Mion, PLLC

(57) ABSTRACT

A wearable device includes: a display; a sensor, memory storing instructions, and at least one processor comprising processing circuitry, wherein the instructions, when executed by the at least one processor individually or collectively, cause the wearable device to: identify, in a displaying area of the display, areas in which each of a plurality of screens is displayed; identify, based on a direction of a body part of a user wearing the wearable device, a first area among the areas corresponding to the direction, wherein the direction of the body part of the user is identified by data of the sensor; display, based on the identified first area, a first screen corresponding to the first area in a first preset state, and display at least one second screen that is
(Continued)

different from the first screen in a second preset state that is different from the first preset state.

20 Claims, 18 Drawing Sheets

(58) Field of Classification Search
USPC .......... 345/156
See application file for complete search history.

(56) References Cited

U.S. PATENT DOCUMENTS

| | | | | |
|---|---|---|---|---|
| 11,366,564 | B2 | 6/2022 | Kumar et al. | |
| 2012/0083312 | A1* | 4/2012 | Kim | G02B 30/33 455/566 |
| 2014/0184496 | A1* | 7/2014 | Gribetz | G06F 3/017 345/156 |
| 2018/0077409 | A1 | 3/2018 | Heo et al. | |
| 2018/0176547 | A1 | 6/2018 | Kobayashi | |
| 2020/0082624 | A1 | 3/2020 | Murphy-Chutorian et al. | |
| 2020/0201048 | A1 | 6/2020 | Nakata et al. | |
| 2020/0374508 | A1 | 11/2020 | Kobayashi | |
| 2020/0379560 | A1 | 12/2020 | Krasadakis | |
| 2022/0019293 | A1* | 1/2022 | Komaki | G06F 3/017 |
| 2022/0155909 | A1* | 5/2022 | Kawashima | G06F 3/0362 |
| 2022/0358877 | A1* | 11/2022 | Hack | G06V 10/82 |
| 2023/0128749 | A1* | 4/2023 | Meek | H04B 1/3877 455/575.1 |

FOREIGN PATENT DOCUMENTS

| | | | | | |
|---|---|---|---|---|---|
| JP | 2018-101019 | A | | 6/2018 | |
| JP | 2018-198075 | A | | 12/2018 | |
| JP | 2019-39988 | A | | 3/2019 | |
| JP | 2019-145120 | A | | 8/2019 | |
| JP | 2019-211865 | A | | 12/2019 | |
| KR | 10-2020-0110771 | A | | 9/2020 | |
| KR | 102361985 | B1 | * | 2/2022 | G06V 10/94 |
| KR | 10-2022-0089023 | A | | 6/2022 | |
| WO | WO-2018210656 | A1 | * | 11/2018 | G06T 19/006 |
| WO | 2022/140129 | A1 | | 6/2022 | |
| WO | WO-2022221517 | A1 | * | 10/2022 | G06V 10/25 |

OTHER PUBLICATIONS

Communication dated Jun. 30, 2025 issued by the European Patent Office in European Patent Application No. 23882951.9.
Communication issued Feb. 13, 2026 by the European Patent Office in European Patent Application No. 23882951.9.

* cited by examiner

WEARABLE DEVICE FOR CHANGING STATE OF SCREEN, AND METHOD THEREFOR

CROSS-REFERENCE TO RELATED APPLICATIONS

This application is a by-pass continuation application of International Application No. PCT/KR 2023/015550, filed on Oct. 10, 2023, which is based on and claims priority to Korean Patent Application No. 10-2022-0141918, filed on Oct. 28, 2022, and Korean Patent Application No. 10-2022-0161654, filed on Nov. 28, 2022, in the Korean Intellectual Property Office, the disclosures of which are incorporated by reference herein their entireties.

BACKGROUND

1. Field

The present disclosure relates to a wearable device for changing a state of a screen, and a method, therefore.

2. Description of Related Art

To provide an enhanced user experience, an electronic device that provides an augmented reality (AR) service displaying information generated by a computer in association with an external object within the real world is being developed. The electronic device may be a wearable device that a user may wear. For example, the electronic device may be AR glasses and/or a head-mounted device (HMD).

SUMMARY

A wearable device according to an embodiment may comprise a display, a sensor, memory comprising one or more storage media storing instructions, and at least one processor comprising processing circuitry. The instructions, when executed by the at least one processor individually or collectively, may cause the wearable device to identify, in a displaying area of the display, areas in which each of a plurality of screens is displayed. The instructions, when executed by the at least one processor individually or collectively, may cause the wearable device to identify, based on a direction of a body part of a user wearing the wearable device that is identified by data of the sensor, a first area among the areas corresponding to the direction. The instructions, when executed by the at least one processor individually or collectively, may cause the wearable device to display, based on identifying the first area, a first screen corresponding to the first area in a first preset state, and display at least one second screen that is different from the first screen in a second preset state that is different from the first preset state. The first preset state and the second preset state are included in distinct states distinguished by whether interaction associated with a screen is permitted.

A method of a wearable device according to an embodiment may comprise identifying, in a displaying area of a display in the wearable device, areas in which each of a plurality of screens is displayed. The method may comprise identifying, based on a direction of a body part of a user wearing the wearable device that is identified by data of a sensor in the wearable device, a first area among the areas corresponding to the direction. The method may comprise displaying, based on identifying the first area, a first screen corresponding to the first area in a first preset state, and displaying at least one second screen that is different from the first screen in a second preset state that is different from the first preset state. The first preset state and the second preset state are included in distinct states distinguished by whether interaction associated with a screen is permitted.

A wearable device according to an embodiment may comprise a display, a sensor, a first processor, and a second processor. The first processor may be configured to switch states of a plurality of processes executed by the first processor from a first preset state in which a three dimensional rendering by the second processor is enabled to a second preset state. The first processor may be configured to identify, while displaying screens respectively corresponding to the plurality of processes through the display, motion towards at least one first screen among the screens using the sensor. The first processor may be configured to switch, based on identifying the motion, a state of at least one first process corresponding to the at least one first screen from the second preset state to the first preset state. The first processor may be configured to execute, based on the at least one first process executed in the first preset state, at least one function for interaction.

A method of a wearable device according to an embodiment may comprise switching, using a first processor in the wearable device, states of a plurality of processes from a first preset state in which a three dimensional rendering by a second processor different from the first processor is enabled, to a second preset state. The method may comprise, displaying screens respectively corresponding to the plurality of processes through a display in the wearable device, and identifying, using a sensor in the wearable device, motion towards at least one first screen among the screens. The method may comprise switching, based on identifying the motion, a state of at least one first process corresponding to the at least one first screen, to the first preset state from the second preset state. The method may comprise executing, based on the at least one first process executed in the first preset state, at least one function for interaction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
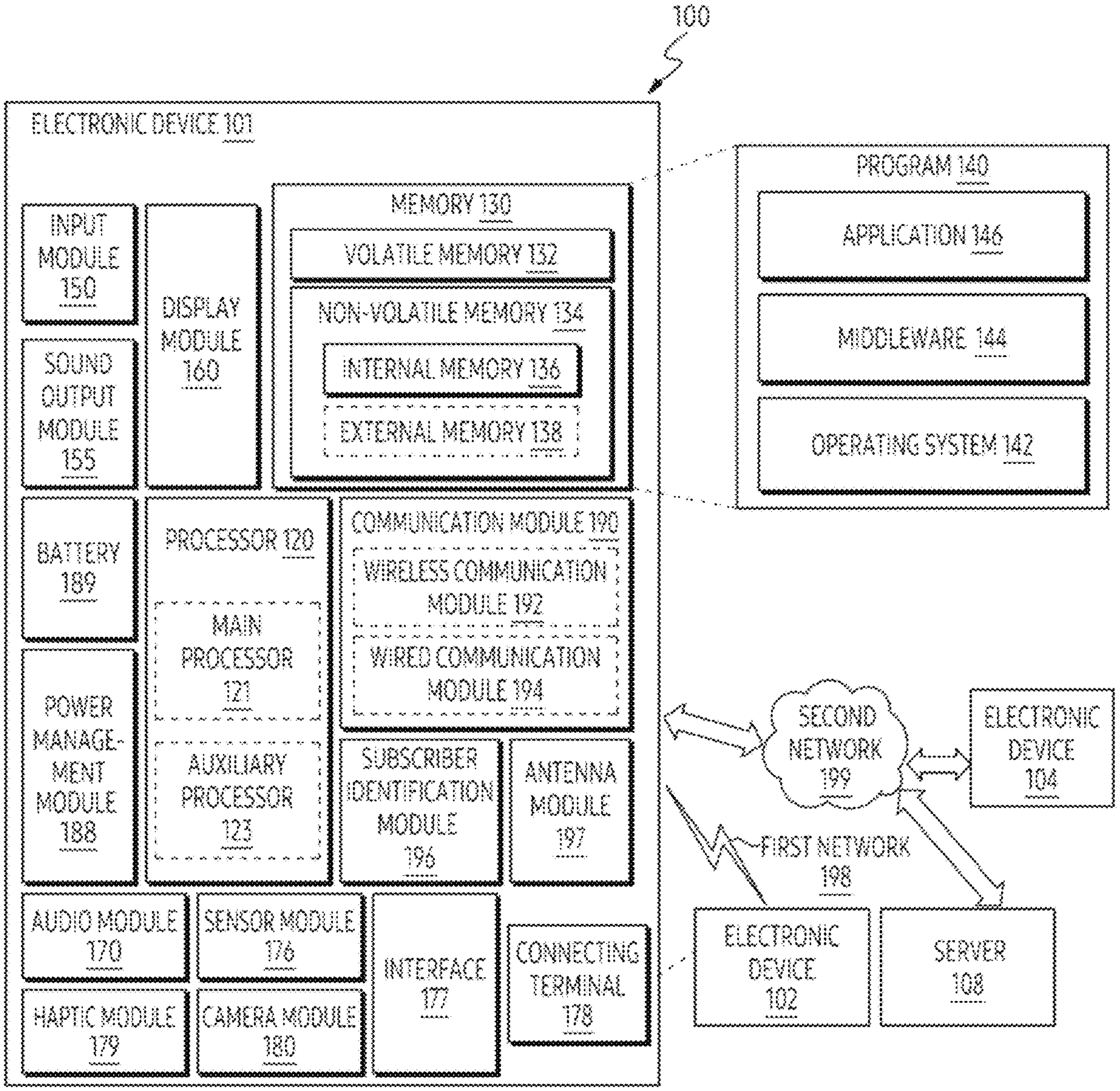
FIG. 1 is a block diagram of an electronic device in a network environment according to various embodiments.

Hereinafter, various embodiments of the present disclosure will be described with reference to the accompanying drawings.

The various embodiments of the present disclosure and terms used herein are not intended to limit the technology described in the present disclosure to specific embodiments, and should be understood to include various modifications, equivalents, or substitutes of the corresponding embodiment. In relation to the description of the drawings, a reference numeral may be used for a similar component. A singular expression may include a plural expression unless it is clearly meant differently in the context. In the present disclosure, an expression such as “A or B”, “at least one of A and/or B”, “A, B or C”, or “at least one of A, B and/or C”, and the like may include all possible combinations of items listed together. Expressions such as “1st”, “2nd”, “first” or “second”, and the like may modify the corresponding components regardless of order or importance, is only used to distinguish one component from another component, but does not limit the corresponding components. When a (e.g., first) component is referred to as “connected (functionally or communicatively)” or “accessed” to another (e.g., second) component, the component may be directly connected to the other component or may be connected through another component (e.g., a third component).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include (but are not limited to), for example, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more of the above artificial neural network. The disclosure is not limited to the above examples. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related to the software. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., through a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through a wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) between the above-described components via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
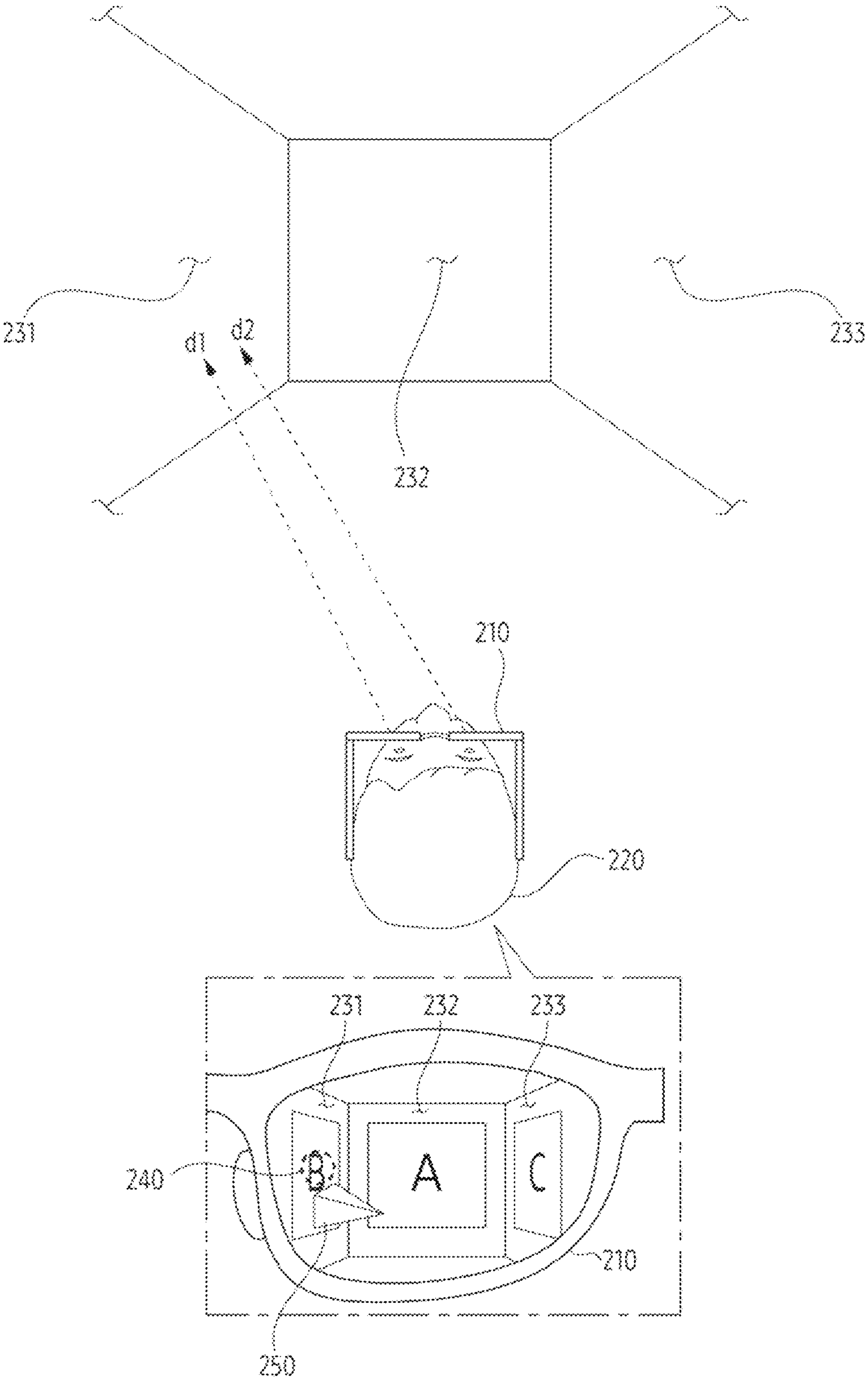
FIG. 2 illustrates an example of a plurality of screens displayed by a wearable device according to an embodiment.

FIG. 2 illustrates an example of a plurality of screens displayed by a wearable device 210 according to an embodiment. The wearable device 210 of FIG. 2 may include AR glasses or a head-mounted display (HM D), wearable on a head of a user 220. FIG. 2 illustrates that an external appearance of the wearable device 210 has glasses. However, the disclosure is not limited to the embodiment of FIG. 2. An example of a structure of the wearable device 210 wearable on the head of the user 220 will be described with reference to FIG. 3A to FIG. 3B and/or FIG. 4A to FIG. 4B. The wearable device 210 of FIG. 2 may be an example of the electronic device 101 of FIG. 1. One or more hardware included in the wearable device 210 and one or more programs executed by the wearable device 210 will be exemplarily described with reference to FIG. 5 to FIG. 6.

According to an embodiment, the wearable device 210 may execute a function associated with augmented reality (AR) and/or mixed reality (MR). Referring to FIG. 2, in a state in which the user 220 is wearing the wearable device 210, the wearable device 210 may include at least one lens disposed adjacent to eyes of the user 220. The wearable device 210 may couple ambient light passing through the lens to light emitted from a display of the wearable device 210. A displaying area of the display may be formed in a lens through which the ambient light passes. Since the wearable device 210 couples the ambient light and the light emitted from the display, the user 220 may see an image in which a real object recognized by the ambient light and a virtual object formed by the light emitted from the display are mixed.

According to an embodiment, the wearable device 210 may execute a function associated with a 'video see-through' (VST) and/or virtual reality (VR). Referring to FIG. 2, in a state in which the user 220 is wearing the wearable device 210, the wearable device 210 may include a housing covering the eyes of the user 220. In the state, the wearable device 210 may include a display disposed on a first surface of the housing towards the eye. The wearable device 210 may include a camera disposed on a second surface opposite to the first surface. Using the camera, the wearable device 210 may obtain frames including the ambient light. The wearable device 210 may, by outputting the frames in the display disposed on the first surface, make the user 220 to recognize the ambient light through the display. The displaying area of the display disposed on the first surface may be formed by one or more pixels included in the display. The wearable device 210 may enable the user 220 to recognize the virtual object together with the real object recognized by the ambient light by synthesizing the virtual object in the frames outputted through the display.

FIG. 2 illustrates an example in which the user 220 positioned in an external space including wall surfaces 231, 232, and 233 wears the wearable device 210. In an example of FIG. 2, the wearable device 210 may enable the user 220 to recognize an external space based on the AR, the MR, or the VST. FIG. 2 illustrates an image shown by the user 220 wearing the wearable device 210. The wearable device 210 according to an embodiment may display screens A, B, and C by being superimposed on an external object. The wearable device 210 may display the screens A, B, and C in the displaying area of the display. For example, the wearable device 210 may display the screens A, B, and C in different areas in the displaying area.

Referring to FIG. 2, the wearable device 210 according to an embodiment may change a shape, a position, and/or a size of each of the screens A, B, and C based on the external object displayed through the displaying area. Referring to FIG. 2, the wearable device 210 may change a direction or the shape of the screens A, B, and C based on a direction (e.g., a direction in which a normal line of a wall surface towards) or a shape of the wall surfaces 231, 232, and 233. For example, in the displaying area, the screen B disposed in a portion where the wall surface 231 is visible may have a shape (e.g., a trapezoidal shape) of the wall 231 visible through the displaying area. For example, in the displaying area, the screen A (disposed in a portion where the wall surface 232) is visible may have a shape (e.g., a rectangular shape) of the wall surface 232 visible through the displaying area. The disclosure is not limited to the above example embodiment. The wearable device 210 may display a screen and/or a virtual object having a set shape and/or position, independently of a shape and/or a position of the external object visible through the displaying area.

According to an embodiment, the wearable device 210 may display the screens A, B, and C by executing an application (e.g., a web browser application). For example, the wearable device 210 may execute the application in a unit of a process (or an instance). Each of the screens A, B, and C may correspond to each of different processes executed by the wearable device 210. The wearable device 210 may perform a rendering with respect to the screens A, B, and C based on the execution of the processes. The wearable device 210 may change a state of the process based on a position of a portion 240 focused by the user 220 in the displaying area. The state of the process may be distinguished by a resource of the wearable device 210 used for a rendering of a screen corresponding to the process. The state of the process may be distinguished by whether a three dimensional rendering of one or more visual objects included in a screen provided by execution of the process is permitted. An operation in which the wearable device 210 according to an embodiment adjusts a state of processes for executing each of the screens A, B, and C will be described with reference to FIG. 7.

The wearable device 210 may identify the portion 240 in which the user 220 gazes by identifying at least one of a direction in which the head, the eyes, or a hand of the user 220 towards, for example, as shown in "d1" and "d2" of FIG. 2. According to an embodiment, an operation in which the wearable device 210 identifies the portion 240 in the displaying area in which the user 220 gazes will be described with reference to FIG. 9. According to an embodiment, the wearable device 210 may make a state of the screen B superimposed with the portion 240 among the screens A, B, and C different from a state of the other screens A and C. For example, the wearable device 210 may change a state of processes corresponding to the other screens A and C different from the screen B in which the user 220 gazes, to a preset state in which access with respect to a resource (e.g., a graphic processing unit) of the wearable device 210 is partially restricted. In the example, the wearable device 210 may reduce an available resource for other processes for execution of a process corresponding to the screen B.

Referring to FIG. 2, in a state of identifying the portion 240 in the displaying area in which the user 220 gazes, the wearable device 210 may display a visual object 250 included in the screen B by performing a rendering (e.g., a three dimensional rendering) based on a three dimensional coordinate system. Referring to FIG. 2, based on the three dimensional rendering, the wearable device 210 may display the visual object 250 in three dimensions in the displaying area. The visual object 250 displayed in three dimensions may have a shape extending in a direction perpendicular to a plane, on the screen B having a shape of the plane. In an example of FIG. 2, in a case that the visual object 250 has a pyramid shape, the wearable device 210 may display the visual object 250 by being superimposed with another screen A in the displaying area, by extending the pyramid in a direction perpendicular from the screen B. An operation in which the wearable device 210 performs the three dimensional rendering based on the visual object 250 having the pyramid shape has been exemplarily described. However, the disclosure is not limited to the above example embodiment. A category of a visual object (e.g., the visual object 250) that may be disposed in the screen B will be described with reference to FIG. 8.

Referring to FIG. 2, in a state in which the user 220 identifies the portion 240 in the displaying area, independently of displaying in three dimensions the visual object 250 of the screen B superimposed with the portion 240, the wearable device 210 may restrictively permit a rendering associated with the screens A and C, spaced apart from the portion 240. For example, the wearable device 210 may restrict performing the three dimensional rendering associated with the screens A and C. Since performing of the three-dimensional rendering associated with the screens A and C is restricted, at least one visual object, included in the screens A and C, requiring the rendering based on the three dimensional coordinate system, may not be displayed in the displaying area. In the example, since performing of the three-dimensional rendering associated with the at least one visual object included in the screens A and C is restricted, the wearable device 210 may reduce a resource used in a portion different from the portion 240 in which the user 220 gazes.

In an embodiment, states of processes corresponding to each of the screens A, B, and C may be distinguished by whether a rendering based on the three dimensional coordinate system is permitted. For example, a state of the process corresponding to the screen B may be a first preset state in which performing of the rendering based on the three dimensional coordinate system is permitted. For example, states of processes corresponding to the screens A and C may be a state, which is a second preset state that is different from the first preset state, in which performing of the rendering based on the three dimensional coordinate system is restricted. The states of the processes may be switched based on whether the position of the portion 240 in the displaying area in which the user 220 gazes is changed. An operation in which the wearable device 210 according to an embodiment changes the state of the processes based on a change in the position of the portion 240 will be described with reference to FIG. 10A to FIG. 10D.

In an embodiment, the states of the processes corresponding to each of the screens A, B, and C may be distinguished by whether execution of at least one function to interact with the user is permitted, among executable functions by the process. For example, the first preset state of the process corresponding to the screen B may include a state in which the execution of the at least one function to interact with the user 220 is permitted. In the example, the second preset state of the processes corresponding to the screens A and C different from the screen B may include the state in which the execution of the at least one function to interact with the user 220 is ceased. For example, since the user 220 gazes at the screen B, a first probability that the user 220 will perform an input associated with the screen B may be higher than second probabilities that the user 220 will perform an input associated with the screens A and C. Since the first probability is higher than the second probabilities, the wearable device 210 may set the state of the process corresponding to the screen B to the first preset state in which the execution of the at least one function to interact with the user 220 is permitted. The wearable device 210 may set the state of the processes corresponding to the screens A and C to the second preset state that is different from the first preset state.

According to an embodiment, the wearable device 210 may display the screens A, B, and C provided from different processes in the displaying area of the display. In order to display the screens A, B, and C, the wearable device 210 may identify different areas in which the screens A, B, and C are displayed in the displaying area. For example, the wearable device 210 identifying the areas may include determining a position and/or a shape of the screens A, B, and C, based on the shape of the external object (e.g., the wall surfaces 231, 232, and 233) displayed through the displaying area. While displaying the screens A, B, and C in the displaying area, the wearable device 210 may identify the portion 240 in the displaying area based on a direction of the body part (e.g., the head, the eyes, and/or the hand) of the user 220 wearing the wearable device 210. The wearable device 210 may identify the screen B corresponding to the portion 240 among the screens A, B, and C. The wearable device 210 may display the identified screen B in the first preset state in which a three dimensional rendering of a visual object in a preset type is enabled. The preset type may be set to reduce or temporarily cease a degree of rendering, such as the visual object 250. The degree of rendering may be associated with a quality of a texture (e.g., resolution and/or a size), and/or a frames per second (fps). The wearable device 210 may display another screen (e.g., the screens A and C) different from the screen B in the second preset state that is different from the first preset state. The second preset state may include a state in which the rendering of the visual object based on the three dimensional coordinate system is disabled and/or a state in which the degree of rendering is reduced. Among the screens A, B, and C, by partially performing the rendering based on the three dimensional coordinate system, the wearable device 210 may reduce power consumption and/or an amount of computation generated by performing of the three dimensional rendering.

Hereinafter, different examples of structures of wearable device 210 according to an embodiment will be described with reference to FIG. 3A to FIG. 3B and/or FIG. 4A to FIG. 4B.

Figure 3A:
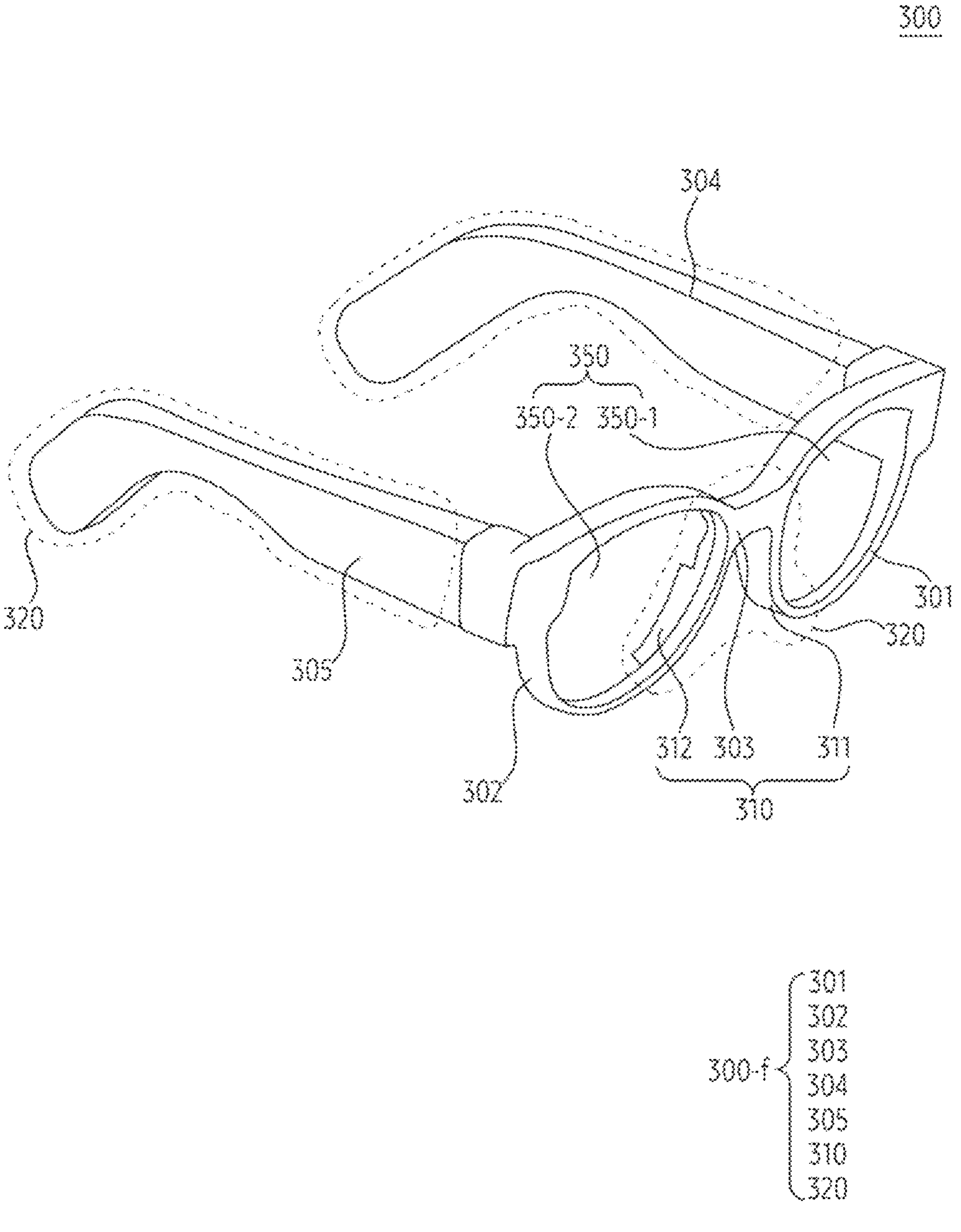
FIG. 3A illustrates an example of a perspective view of a wearable device according to an embodiment.

FIG. 3A illustrates an example of a perspective view of a wearable device according to an embodiment. A wearable device 300 of FIGS. 3A to 3B may be an example of the wearable device 210 of FIG. 2. As shown in FIG. 3A, the wearable device 300 according to an embodiment may include at least one display 350 and a frame 300-*f* supporting the at least one display 350.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may output a virtual reality image through at least one display 350, in response to a user's preset gesture obtained through a motion recognition camera 340-2 of FIG. 3B.

According to an embodiment, the at least one display 350 in the wearable device 300 may provide visual information to a user. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Figure 3B:
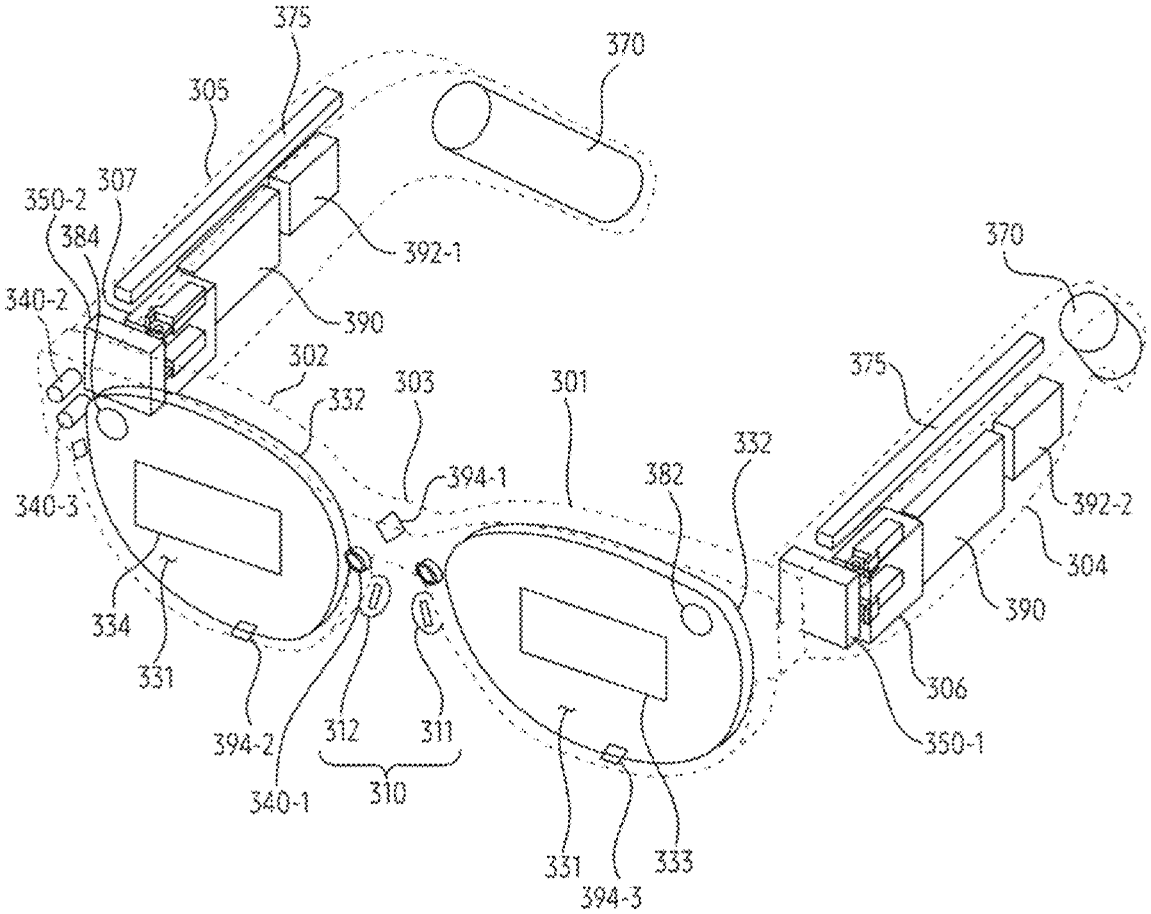
FIG. 3B illustrates an example of one or more hardware disposed in a wearable device according to an embodiment.

Referring to FIG. 3B, the at least one display 350 may form a display area on the lens to provide a user wearing the wearable device 300 with visual information included in ambient light passing through the lens and other visual information distinct from the visual information. The lens may be formed based on at least one of a Fresnel lens, a pancake lens, or a multi-channel lens. The display area formed by the at least one display 350 may be formed on the second surface 332 of the first surface 331 and the second surface 332 of the lens. When the user wears the wearable device 300, ambient light may be transmitted to the user by being incident on the first surface 331 and being penetrated through the second surface 332. For another example, the at least one display 350 may display a virtual reality image to be coupled with a reality screen transmitted through ambient light. The virtual reality image outputted from the at least one display 350 may be transmitted to eyes of the user, through one or more hardware (e.g., optical devices 382 and 384, and/or at least one waveguides 333 and 334) included in the wearable device 300.

According to an embodiment, the wearable device 300 may include waveguides 333 and 334 that transmit light transmitted from the at least one display 350 and relayed by the at least one optical device 382 and 384 by diffracting to the user. For example, the waveguides 333 and 334 may be formed based on at least one of glass, plastic, or polymer. For example, a nano pattern may be formed on at least a portion of the outside or inside of the waveguides 333 and 334. The nano pattern may be formed based on a grating structure having a polygonal or curved shape. Light incident to an end of the waveguides 333 and 334 may be propagated to another end of the waveguides 333 and 334 by the nano pattern. The waveguides 333 and 334 may include at least one of at least one diffraction element (e.g., a diffractive optical element (DOE), a holographic optical element (HOE)), and a reflection element (e.g., a reflection mirror). For example, the waveguides 333 and 334 may be disposed in the wearable device 300 to guide a screen displayed by the at least one display 350 to the user's eyes. For example, the screen may be transmitted to the user's eyes through total internal reflection (TIR) generated in the waveguides 333 and 334.

According to an embodiment, the wearable device 300 may analyze an object included in a real image collected through a photographing camera 340-1, combine with a virtual object corresponding to an object that become a subject of augmented reality provision among the analyzed object, and display on the at least one display 350. The virtual object may include at least one of text and images for various information associated with the object included in the real image. The wearable device 300 may analyze the object based on a multi-camera such as a stereo camera. For the object analysis, the wearable device 300 may execute time-of-flight (ToF) and/or simultaneous localization and mapping (SLA M) supported by the multi-camera. The user wearing the wearable device 300 may watch an image displayed on the at least one display 350.

According to an embodiment, a frame 300-*f* may be configured with a physical structure in which the wearable device 300 may be worn on the user's body. According to an embodiment, the frame 300-*f* may be configured so that when the user wears the wearable device 300, the first display 350-1 and the second display 350-2 may be positioned corresponding to the user's left and right eyes. The frame 300-*f* may support the at least one display 350. For example, the frame 300-*f* may support the first display 350-1 and the second display 350-2 to be positioned at positions corresponding to the user's left and right eyes.

According to an embodiment, referring to FIG. 3A, according to an embodiment, the frame 300-*f* may include an area 320 at least partially in contact with the portion of the user's body in a case that the user wears the wearable device 300. For example, the area 320 of the frame 300-*f* in contact with the portion of the user's body may include an area in contact with a portion of the user's nose, a portion of the user's ear, and a portion of the side of the user's face that the wearable device 300 contacts. According to an embodiment, the frame 300-*f* may include a nose pad 310 that is contacted on the portion of the user's body. When the wearable device 300 is worn by the user, the nose pad 310 may be contacted on the portion of the user's nose. The frame 300-*f* may include a first temple 304 and a second temple 305, which are contacted on another portion of the user's body that is distinct from the portion of the user's body.

According to an embodiment, the frame 300-*f* may include a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the wearer's ear, and the second temple 305 extending from the second rim 302 and fixed to a portion of the ear opposite to the ear. The first pad 311 and the second pad 312 may be in contact with the portion of the user's nose, and the first temple 304 and the second temple 305 may be in contact with a portion of the user's face and the portion of the user's ear. The temples 304 and 305 may be rotatably connected to the rim (e.g., the first rim 301 or the second rim 302) through hinge units 306 and 307 of FIG. 3B. The first temple 304 may be rotatably connected with respect to the first rim 301 through the first hinge unit 306 disposed between the first rim 301 and the first temple 304. The second temple 305 may be rotatably connected with respect to the second rim 302 through the second hinge unit 307 disposed between the second rim 302 and the second temple 305. According to an embodiment, the wearable device 300 may identify an external object (e.g., a user's fingertip) touching the frame 300-*f* and/or a gesture performed by the external object by using a touch sensor, a grip sensor, and/or a proximity sensor formed on at least a portion of the surface of the frame 300-*f*.

According to an embodiment, the wearable device 300 may include hardware (e.g., hardware described based on the block diagram of FIG. 6) that performs various functions. For example, the hardware may include a battery module 370, an antenna module 375, optical devices 382 and 384, speakers 392-1 and 392-2, microphones 394-1, 394-2, and 394-3, a depth sensor module, and/or a printed circuit board 390. Various hardware may be disposed in the frame 300-*f*.

According to an embodiment, the microphones 394-1, 394-2, and 394-3 of the wearable device 300 may obtain a sound signal, by being disposed on at least a portion of the frame 300-*f*.

FIG. 3B illustrates the first microphone 394-1 disposed on the nose pad 310, the second microphone 394-2 disposed on the second rim 302, and the third microphone 394-3 disposed on the first rim 301. But the number and disposition of the microphone 394 are not limited to an embodiment of FIG. 3B. In a case that the number of the microphone 394 included in the wearable device 300 is two or more, the wearable device 300 may identify a direction of the sound signal by using a plurality of microphones disposed on different portions of the frame 300-*f*.

According to an embodiment, the optical devices 382 and 384 may transmit a virtual object transmitted from the at least one display 350 to the wave guides 333 and 334. For example, the optical devices 382 and 384 may be projectors. The optical devices 382 and 384 may be disposed adjacent to the at least one display 350 or may be included in the at least one display 350 as a portion of the at least one display 350. The first optical device 382 may correspond to the first display 350-1, and the second optical device 384 may correspond to the second display 350-2. The first optical device 382 may transmit light outputted from the first display 350-1 to the first waveguide 333, and the second optical device 384 may transmit light outputted from the second display 350-2 to the second waveguide 334.

In an embodiment, a camera 340 may include an eye tracking camera 340-1, a motion recognition camera 340-2 and/or the photographing camera 340-3. The photographing camera 340-3, the eye tracking camera 340-1, and the motion recognition camera 340-2 may be disposed at different positions on the frame 300-*f* and may perform different functions. The eye tracking camera 340-1 may output data indicating a gaze of the user wearing the wearable device 300. For example, the wearable device 300 may detect the gaze from an image including the user's pupil, obtained through the eye tracking camera 340-1. FIG. 3 illustrates an example in which the eye tracking camera 340-1 is disposed toward the user's right eye. However, embodiments of disclosure are not limited thereto. The eye tracking camera 340-1 may be disposed alone toward the user's left eye or may be disposed toward two eyes.

In an embodiment, the photographing camera 340-3 may photograph a real image or background to be matched with a virtual image in order to implement the augmented reality or mixed reality content. The photographing camera may photograph an image of a specific object existing at a position viewed by the user and may provide the image to the at least one display 350. The at least one display 350 may display one image in which a virtual image provided through the optical devices 382 and 384 is overlapped with information on the real image or background including the image of the specific object obtained by using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 350, by tracking the gaze of the user wearing the wearable device 300. For example, when the user looks at the front, the wearable device 300 may naturally display environment information associated with the user's front on the at least one display 350 at a position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

The motion recognition camera 340-2 may provide a specific event to the screen provided on the at least one display 350 by recognizing the movement of the whole or portion of the user's body, such as the user's torso, hand, or face. The motion recognition camera 340-2 may obtain a signal corresponding to motion by recognizing the user's gesture, and may provide a display corresponding to the signal to the at least one display 350. A processor may identify a signal corresponding to the operation and may perform a preset function based on the identification. In an embodiment, the motion recognition camera 340-2 may be disposed on the first rim 301 and/or the second rim 302.

In an embodiment, the camera 340 included in the wearable device 300 is not limited to the above-described eye tracking camera 340-1 and the motion recognition camera 340-2. For example, the wearable device 300 may identify an external object included in the FoV by using the photographing camera 340-3 disposed toward the user's FoV. Identifying of the external object by the wearable device 300 may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, in order to obtain an image including a face of the user wearing the wearable device 300, the wearable device 300 may include the camera 340 (e.g., a face tracking (FT) camera) disposed toward the face.

In an embodiment, the wearable device 300 may further include a light source (e.g., a light emitting diode (LED)) that emits light toward a subject (e.g., user's eyes, face, and/or an external object in the FoV) photographed by using the camera 340. For example, the light source may include the LED having an infrared wavelength. For example, the light source may be disposed on at least one of the frame 300-*f*, or the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370, respectively, may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electrically or operably connected to communication circuitry (e.g., communication circuitry 650 to be described later with reference to FIG. 6) in the wearable device 300. In an embodiment, the antenna module 375 may be disposed in the first temple 304 and/or the second temple 305. For example, the antenna module 375 may be disposed close to one surface of the first temple 304 and/or the second temple 305.

In an embodiment, the speakers 392-1 and 392-2 may output a sound signal to the outside of the wearable device 300. A sound output module may be referred to as a speaker. In an embodiment, the speakers 392-1 and 392-2 may be disposed in the first temple 304 and/or the second temple 305 in order to be disposed adjacent to the ear of the user wearing the wearable device 300. For example, the wearable device 300 may include a second speaker 392-2 disposed adjacent to the user's left ear by being disposed in the first temple 304, and a first speaker 392-1 disposed adjacent to the user's right ear by being disposed in the second temple 305.

In an embodiment, the light emitting module may include at least one light emitting element. The light emitting module may emit light of a color corresponding to a specific state or may emit light through an operation corresponding to the specific state in order to visually provide information on a specific state of the wearable device 300 to the user. For example, when the wearable device 300 requires charging, it may emit red light at a constant cycle. In an embodiment, the light emitting module may be disposed on the first rim 301 and/or the second rim 302.

Referring to FIG. 3B, according to an embodiment, the wearable device 300 may include the printed circuit board (PCB) 390. For example, the PCB 390 may be included in at least one of the first temple 304 or the second temple 305. The PCB 390 may include an interposer disposed between at least two sub PCBs. On the PCB 390, one or more hardware (e.g., hardware illustrated by blocks described below with reference to FIG. 5) included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. The wearable device 300 may measure gravity acceleration, and/or acceleration based on preset 3-dimensional axes (e.g., x-axis, y-axis, and z-axis) perpendicular to each other, by using each of the gravity sensor and/or the acceleration sensor. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IM U.

Figure 4A:
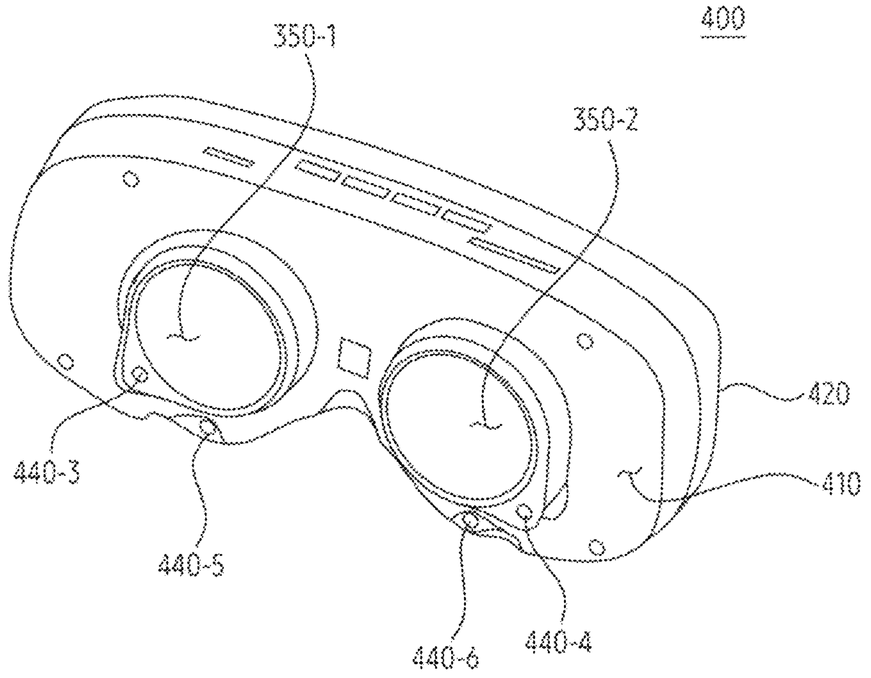
FIG. 4A to FIG. 4B illustrate an example of an exterior of a wearable device according to an embodiment.
Figure 4B:
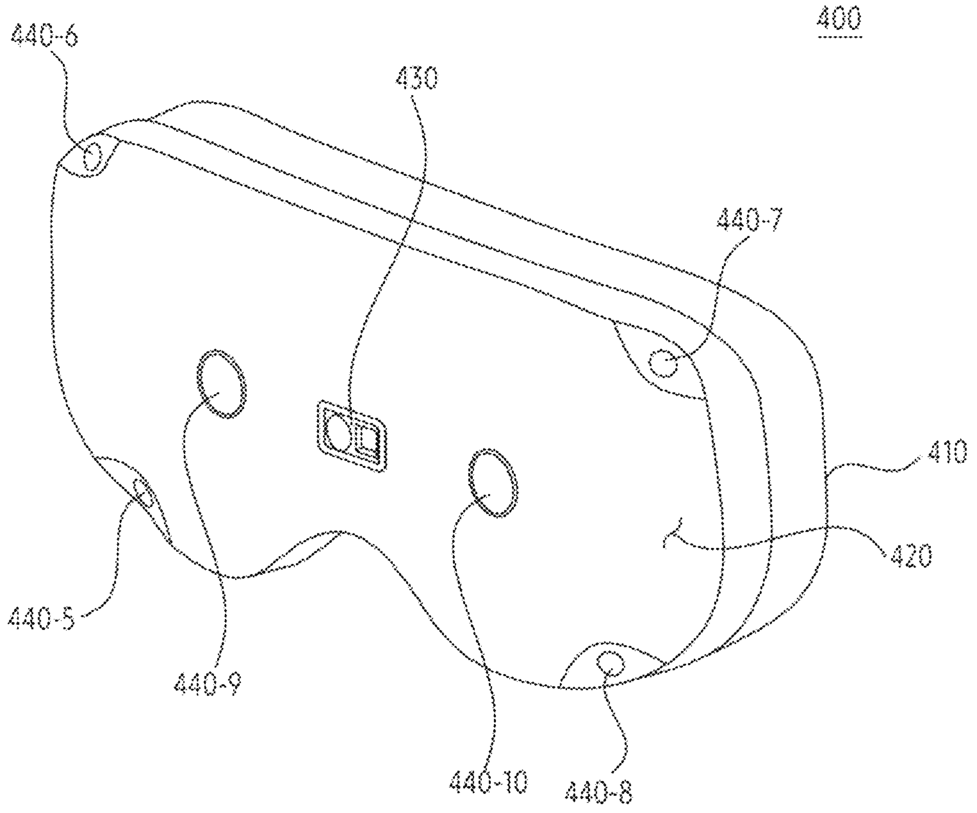

FIGS. 4A to 4B illustrate an example of an exterior of a wearable device 400 according to an embodiment. The wearable device 400 of FIGS. 4A to 4B may be an example of the wearable device 210 of FIG. 2. FIG. 4A illustrates an example of an exterior of a first surface 410 of a housing of the wearable device 400. FIG. 4B illustrates an example of an exterior of a second surface 420 opposite to the first surface 410.

Referring to FIG. 4A, according to an embodiment, the first surface 410 of the wearable device 400 may have an attachable shape on the user's body part (e.g., the user's face). In an embodiment, the wearable device 400 may further include a strap for being fixed on the user's body part, and/or one or more temples (e.g., the first temple 304 and/or the second temple 305 of FIGS. 3A to 3B). A first display 350-1 for outputting an image to the left eye among the user's two eyes and a second display 350-2 for outputting an image to the right eye among the user's two eyes may be disposed on the first surface 410. The wearable device 400 may further include rubber or silicon packing, which are formed on the first surface 410, for preventing interference by light (e.g., ambient light) different from the light emitted from the first display 350-1 and the second display 350-2.

According to an embodiment, the wearable device 400 may include cameras 440-1 and 440-2 for photographing and/or tracking two eyes of the user adjacent to each of the first display 350-1 and the second display 350-2. The cameras 440-1 and 440-2 may be referred to as an ET camera. According to an embodiment, the wearable device 400 may include cameras 440-3 and 440-4 for photographing and/or recognizing the user's face. For example, the cameras 440-3 and 440-4 may be referred to as a FT camera.

Referring to FIG. 4B, a camera (e.g., cameras 440-5, 440-6, 440-7, 440-8, 440-9, and 440-10), and/or a sensor (e.g., the depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 in order to recognize the wearable device 400 and an external object. For example, using the cameras 440-9 and 440-10, the wearable device 400 may obtain an image and/or media to be transmitted to each of the user's two eyes. The camera 440-9 may be disposed on the second surface 420 of the wearable device 400 to obtain an image to be displayed through the second display 350-2 corresponding to the right eye among two eyes. The camera 440-10 may be disposed on the second surface 420 of the wearable device 400 to obtain an image to be displayed through the first display 350-1 corresponding to the left eye among two eyes.

According to an embodiment, the wearable device 400 may include the depth sensor 430 disposed on the second surface 420 in order to identify a distance between the wearable device 400 and the external object. By using the depth sensor 430, the wearable device 400 may obtain spatial information (e.g., a depth map) about at least a portion of the FoV of the user wearing the wearable device 400.

In an embodiment, a microphone for obtaining sound outputted from the external object may be disposed on the second surface 420 of the wearable device 400. The number of microphones may be one or more according to embodiments.

As described above, the wearable device 400 according to an embodiment may have a form factor for being worn on a head of the user. In a state of being worn on the head, the wearable device 400 may provide a user experience based on augmented reality, virtual reality, and/or mixed reality. The wearable device 400 may display at least one screen provided from the application by using the first display 350-1 and the second display 350-2 to be disposed toward each of the two eyes of the user. In a state in which a plurality of screens are displayed, the wearable device 400 adaptively changes a state of processes (or instances) corresponding to each of the plurality of screens, thereby reducing an amount of computation required to display the plurality of screens.

Hereinafter, hardware included in a wearable device (e.g., the wearable device 210 of FIG. 2) including the wearable device 300 of FIG. 3A to FIG. 3B and/or the wearable device 400 of FIG. 4A to FIG. 4B, and/or one or more programs executed by the wearable device will be described with reference to FIG. 5 to FIG. 6.

Figure 5:
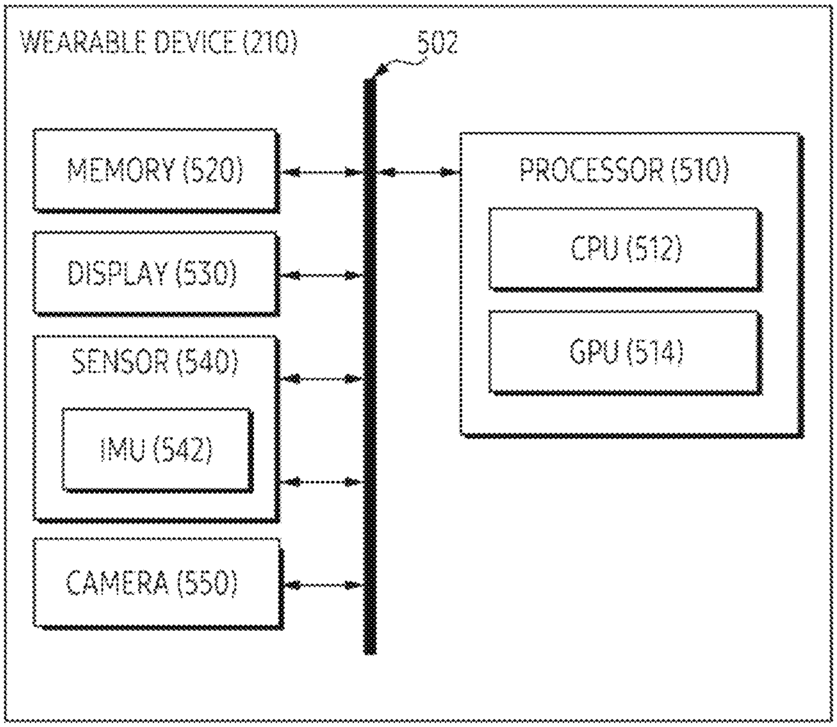
FIG. 5 is a block diagram of a wearable device according to an embodiment.

FIG. 5 is a block diagram of a wearable device 210 according to an embodiment. The wearable device 210 of FIG. 5 may include the wearable device 210 of FIG. 2, the wearable device 300 of FIG. 3A to FIG. 3B, and/or the wearable device 400 of FIG. 4A to FIG. 4B. The wearable device 210 of FIG. 5 may include the electronic device 101 of FIG. 1. In the wearable device 210, a processor 510, memory 520, a display 530, a sensor 540 or a camera 550 may be electronically and/or operably coupled with each other by an electronic component such as a communication bus 502. In the following, hardware being electronically coupled may mean that a direct or indirect connection between the hardware is established by wire or wirelessly so that second hardware among the hardware is controlled by first hardware. In some embodiments, different blocks correspond to the above components or elements. However, the disclosure is not limited to those example embodiments. In other embodiments, a portion (e.g., at least a portion of the processor 510, the memory 520, and/or the sensor 540) of hardware of FIG. 5 may be included in a single integrated circuit such as a system on a chip (SoC). A type and/or the number of hardware components included in the wearable device 210 is not limited as illustrated in FIG. 5. For example, the wearable device 210 may include only a portion of the hardware components illustrated in FIG. 5.

The processor 510 of the wearable device 210 according to an embodiment may include hardware and/or circuitry for processing data based on one or more instructions. The processor 510 of FIG. 5 may include the processor 120 of FIG. 1. The processor 510 of FIG. 5 may be or correspond to a central processing unit (CPU) 512 and a graphic processing unit (GPU) 514. The CPU 512 of FIG. 5 corresponds to the main processor 121 of FIG. 1, and the GPU 514 of FIG. 5 may be an example of the auxiliary processor 123 of FIG. 1. The CPU 512 may include an arithmetic and logic unit (ALU), a floating point unit (FPU), a field programmable gate array (FPGA), and/or an application processor (AP). The number of a first processor 510 may be one or more. For example, the CPU 512 may have a structure of a multi-core processor such as a dual core, a quad core, or a hexa core. The GPU 514 may provide frame data to the memory 520 and/or the display 530. The GPU 514 may obtain the frame data, for example, based on at least one application and/or system software executed by the CPU 512. In an embodiment, the GPU 514 may control graphic memory and/or a display driving integrated-circuit (DDI) of the display 530, based on the frame data. As the display 530 is controlled by the GPU 514, a screen may be outputted.

The memory 520 of the wearable device 210 according to an embodiment may include a hardware component for storing data and/or instructions inputted and/or outputted to the processor 510. The memory 520 may include, for example, a volatile memory such as a random-access memory (RAM) and/or a non-volatile memory such as a read-only memory (ROM). The volatile memory may include, for example, at least one of a dynamic RAM (DRAM), a static RAM (SRAM), a cache RAM, and a pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multi-media card (eMMC). The memory 520 of FIG. 5 may include the memory 130 of FIG. 1.

The display 530 of the wearable device 210 according to an embodiment may output visualized information (e.g., at least one of the screens of FIG. 2, FIG. 8 to FIG. 9, and/or FIG. 10A to FIG. 10D) to a user. For example, the display 530 may output the visualized information to the user by being controlled by a controller such as the GPU 514. The display 530 may include a flat panel display (FPD) and/or an electronic paper. The FPD may include a liquid crystal display (LCD), a plasma display panel (PDP), and/or one or more LEDs. In an embodiment, the LED may include an organic LED (OLED). The display 530 of FIG. 5 may include the at least one display 350 of FIG. 3A to FIG. 3B and/or FIG. 4A to FIG. 4B.

The sensor 540 of the wearable device 210 according to an embodiment may generate electronic information that may be processed by the processor 510 (e.g., the CPU 512) and/or the memory 520 from non-electronic information associated with the wearable device 210. For example, the wearable device 210 may include an inertial measurement unit (IM U) 542 for measuring motion of the wearable device 210. In a state the wearable device 210 is worn by a user (e.g., the user 220 of FIG. 2), the motion of the wearable device 210 measured by the IMU 542 may be dependent on motion of the user. The sensor 540 of FIG. 5 may include the sensor module 176 of FIG. 1.

The IMU 542 of the wearable device 210 according to an embodiment may include an acceleration sensor, a geomagnetic sensor, a gyro sensor, or a combination thereof. The acceleration sensor and the geomagnetic sensor may be included in the wearable device 210 in order to measure a physical movement (e.g., translation motion) of the wearable device 210. For example, the acceleration sensor may output sensor data indicating a direction and/or magnitude of acceleration (e.g., acceleration of gravity) applied to wearable device 210 using a plurality of preset axes (e.g., an x-axis, a y-axis, a z-axis) perpendicular to each other. For example, the geomagnetic sensor may output sensor data indicating a direction of a magnetic field (e.g., a direction of the N pole) applied to the wearable device 210 using two dimensional or three dimensional axes. The gyro sensor may be included in the wearable device 210 in order to measure rotation of the wearable device 210. For example, the gyro sensor may output sensor data indicating a parameter (e.g., angular velocity) indicating the rotation of the wearable device 210, based on the axes.

In an embodiment, the IMU 542 is included in the sensor 540. However, embodiments of the disclosure are not limited thereto. According to an embodiment, the sensor 540 may further include other sensors, for example, a global positioning system (GPS) sensor for detecting a geographic location of the wearable device 210. For example, the sensor 540 may include an image sensor, an illumination sensor, and/or a time-of-flight (ToF) sensor for detecting an electromagnetic wave including light.

The camera 550 of the wearable device 210 according to an embodiment may include one or more optical sensors (e.g., a charged coupled device (CCD) sensor or a complementary metal oxide semiconductor (CM OS) sensor) that generate an electrical signal indicating color and/or brightness of light. A plurality of optical sensors included in the camera 550 may be disposed in a form of a two dimensional array. The camera 550 may generate two dimensional frame data corresponding to the light reaching the optical sensors of the two dimensional array by obtaining an electrical signal of each of the plurality of optical sensors substantially simultaneously. For example, photo data captured using the camera 550 may mean one two dimensional frame data obtained from the camera 550. For example, video data captured using camera 550 may mean a sequence of a plurality of images obtained from camera 550 according to a preset frame rate. As described above with reference to FIG. 3A to FIG. 3B and/or FIG. 4A to FIG. 4B, the number of the camera 550 included in the wearable device 210 according to an embodiment may be plural. The camera 550 of FIG. 5 may include the camera module 180 of FIG. 1.

In an embodiment, the wearable device 210 may include an output means for outputting information in a form other than a visualized form. For example, the wearable device 210 may include a speaker for outputting an acoustic signal. For example, the wearable device 210 may include a motor for providing haptic feedback based on vibration.

In the memory 520 of the wearable device 210 according to an embodiment, one or more instructions (or commands) indicating a calculation and/or an operation to be performed by the processor 510 on data may be stored. A set of one or more instructions may be referred to as firmware, an operating system, a process, a routine, a sub-routine and/or an application. For example, the wearable device 210 and/or the processor 510 may perform at least one of operations of FIG. 11 to FIG. 13 when a set of a plurality of instructions distributed in a form of the operating system, the firmware, a driver, and/or the application is executed. Hereinafter, an application being installed in the wearable device 210 may mean that one or more instructions provided in the form of the application are stored in the memory 520 of the wearable device 210, and that the one or more applications are stored in an executable format (e.g., a file with an extension preset by the operating system of the wearable device 210).

The wearable device 210 according to an embodiment may execute one or more processes using the CPU 512. The screens A, B, and C of FIG. 2 may correspond to each of a plurality of processes executed by the CPU 512. A process (or an instance) may be a unit of work for the processor 510 including the CPU 512 to execute instructions based on multitasking. As described above with reference to FIG. 2, according to an embodiment, the CPU 512 may execute one or more processes that provide a screen to be displayed through the display 530 based on different states. For example, the CPU 512 may execute at least one first process of a plurality of processes in a first preset state in which a three dimensional rendering by the GPU 514 is enabled. In the example, the CPU 512 may execute one or more second processes different from the at least one first process in a second preset state in which the three dimensional rendering by the GPU 514 is disabled. The CPU 512 may select a state of each of the plurality of processes from the first preset state or the second preset state based on motion of the user identified by the sensor 540 and/or the camera 550.

Hereinafter, referring to FIG. 6, one or more programs executed by the CPU 512 of the wearable device 210 according to an embodiment to adjust the state of each of the plurality of processes will be described.

Figure 6:
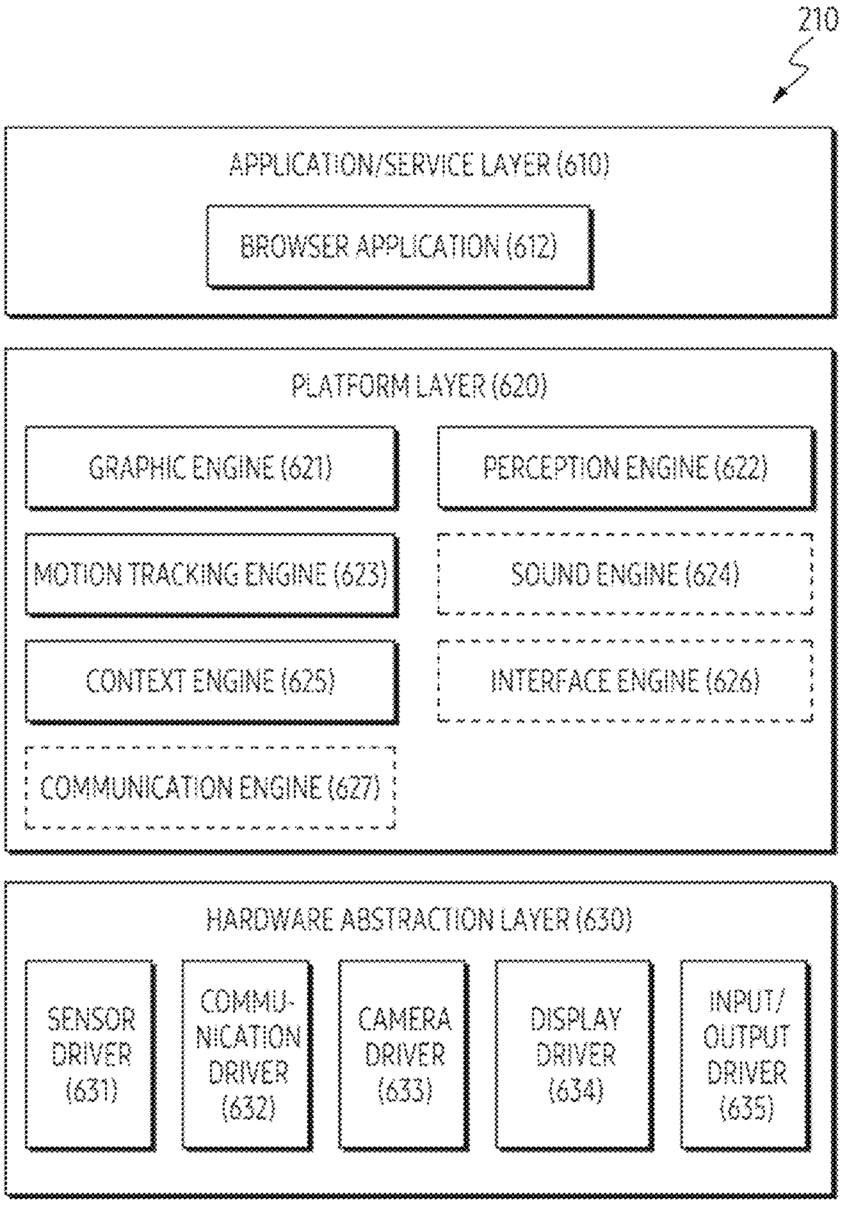
FIG. 6 illustrates an example of one or more programs executed by a wearable device according to an embodiment.

FIG. 6 illustrates an example of one or more programs executed by a wearable device 210 according to an embodiment. The wearable device 210 of FIG. 6 may be an example of the wearable device 210 of FIG. 5. For example, programs distinguished by different layers (e.g., an application/service layer 610, a platform layer 620, and a hardware abstraction layer 630) of FIG. 6 may be executed by the processor 510 (e.g., the CPU 512 and/or the GPU 514) of the wearable device 210 of FIG. 5. Programs distinguished by different blocks of FIG. 6 may be stored in memory (e.g., the memory 520 of FIG. 5) of the wearable device 210 based on a format executable by a processor (e.g., the CPU 512 of FIG. 5) of the wearable device 210. In a state of executing a program distinguished by the different blocks of FIG. 6, the wearable device 210 according to an embodiment may schedule execution of instructions included in the program based on a process (or an instance). The one or more programs of FIG. 6 may be included in the program 140 of FIG. 1.

Referring to FIG. 6, programs installed in the wearable device 210 may be classified into any one of layers of FIG. 6 based on a target. Programs (e.g., a sensor driver 631, a communication driver 632, a camera driver 633, a display driver 634, or an input/output (I/O) driver 635) designed to target hardware of the wearable device 210 may be classified in the hardware abstraction layer 630. The sensor driver 631 may be a program including one or more instructions for controlling a sensor (e.g., the sensor 540 of FIG. 5) of the wearable device 210. The communication driver 632 may be a program for controlling communication circuitry (e.g., the communication module 190 of FIG. 1) of the wearable device 210. The camera driver 633 may be a program including one or more instructions for controlling a camera (e.g., the camera 550 of FIG. 5) of the wearable device 210. The display driver 634 may be a program including one or more instructions for controlling a display (e.g., the display 530 of FIG. 5) of the wearable device 210. The input/output (I/O) driver 635 may be a program for controlling hardware (e.g., a button, a speaker and/or a microphone of the wearable device 210) for interaction between the wearable device 210 and a user.

For example, in the platform layer 620, programs (e.g., a graphic engine 621, a perception engine 622, a motion tracking engine 623, a sound engine 624, a context engine 625, an interface engine 626, and/or a communication engine 627) designed to target any one of programs classified into the hardware abstraction layer 630 and programs classified into the application/service layer 610 may be classified. The programs classified into the platform layer 620 may provide an application programming interface (API) that is executable based on another program. For example, in the application/service layer 610, a program (e.g., a browser application 612) designed to target a user (e.g., the user 220 of FIG. 2) controlling the wearable device 210 may be classified. In FIG. 6, the browser application 612 is an example of a program classified into the application/service layer 610. However, embodiments the disclosure are not limited to the above example. For example, a video streaming application, a computer-aided design (CAD) application, a game application, a gallery application for browsing a photo and/or a video, and a messenger application may be classified into the application/service layer 610.

The wearable device 210 according to an embodiment may identify multimedia content by executing the browser application 612. The multimedia content may include text, an image, an audio, a video, or a combination thereof. The image and/or the video may include not only a sequence of two dimensional frames, but also at least one virtual object requiring a rendering in a three dimensional coordinate system, such as the visual object 250 of FIG. 2.

The wearable device 210 according to an embodiment may execute the graphic engine 621 to visualize information provided from the browser application 612. In response to a call of a preset API based on execution of the browser application 612, the wearable device 210 may execute the graphic engine 621. Based on the execution of the graphic engine 621, a CPU (e.g., the CPU 512 of FIG. 5) of the wearable device 210 may control a GPU (e.g., the GPU 514 of FIG. 5). The CPU may perform a three dimensional rendering with respect to a visual object representing the information by controlling the GPU. For example, the GPU may perform the rendering with respect to the visual object based on a two dimensional coordinate system to the three dimensional coordinate system. For example, performing the three dimensional rendering may include disposing one or more voxels associated with the visual object in the exemplified coordinate system and filling color and/or an image on a plane (e.g., a fragment) formed by at least three voxels. For example, the CPU of the wearable device 210, may input a code (e.g., a code written in a shading language) for controlling the GPU to the GPU, which is a code included in the browser application 612 based on the execution of the graphic engine 621. The CPU may perform the three dimensional rendering based on the code by controlling the GPU. For example, a unit of work of the GPU indicated by the code may be referred to as a "shader".

The wearable device 210 according to an embodiment may identify an area in which a screen provided from the browser application 612 is to be disposed based on execution of the perception engine 622. The screen may include one or more visual objects three dimensional rendered by the execution of the graphic engine 621. For example, the wearable device 210 may identify an external object (e.g., the wall surfaces 231, 232, and 233 of FIG. 2) shown to the user wearing the wearable device 210 based on the execution of the perception engine 622. In order to identify the external object, the wearable device 210 may control a sensor (e.g., a depth sensor such as a ToF sensor) in the wearable device 210 using the sensor driver 631, and/or a camera (e.g., the camera 550 of FIG. 5) in the wearable device 210 using the camera driver 633.

In a state in which the perception engine 622 is executed, the wearable device 210 according to an embodiment may determine a position at which the screen is to be disposed based on the external object. For example, the wearable device 210 may obtain information (e.g., spatial information) for matching a shape and/or a position of the screen to a shape and/or a position of the external object, such as the screen B disposed on the wall 231 of FIG. 2. The information obtained by the wearable device 210 with respect to the screen provided from the browser application 612 may include data of Table 1.

TABLE 1

| Name | Description |
|---|---|
| Space ID | Identifier uniquely assigned to an external space in which the wearable device 210 is included |
| Plane ID | Identifier assigned to a plane of an external object included in the external space |
| X | An x-coordinate of a corner of a screen, disposed on the plane of the |

TABLE 1-continued

| Name | Description |
|---|---|
| | external object |
| Y | A y-coordinate of the corner of the screen, disposed on the plane of the external object |
| W | A width of the screen, disposed on the plane of the external object |
| H | A height of the screen disposed on the plane of the external object |
| URL (uniform resource identifier) | An address in a network of a web page displayed in the screen |

In the exemplary case of FIG. 2, information in which the wearable device 210 obtains with respect to each of screens A, B, and C may include the data illustrated in the Table 1. For example, the information with respect to each of the screens A, B, and C may include a space ID assigned to the external space in which the wall surfaces 231, 232, and 233 are included, in common. Information corresponding to the screen A of FIG. 2 may include a plane ID assigned to the wall surface 232. Similarly, information corresponding to the screen B of FIG. 2 may include a plane ID assigned to the wall surface 231 based on the execution of the perception engine 622. Information corresponding to the screen C of FIG. 2 may include coordinate values for disposing the screen C in the wall surface 233 of FIG. 2 and a width and a height of the screen C in the wall surface 233. The information with respect to each of the screens A, B, and C of FIG. 2 may include URLs of web pages displayed on each of the screens A, B, and C.

The wearable device 210 according to an embodiment may track and/or monitor motion of one or more objects (e.g., the wearable device 210 and/or the user wearing the wearable device 210) based on execution of the motion tracking engine 623. For example, the wearable device 210 may identify the motion using the sensor 540 (e.g., the IMU 542) and/or the camera 550 of FIG. 5. For example, the wearable device 210 may track a position of the wearable device 210 (e.g., the position of the wearable device 210 indicated by a GPS coordinate) based on the execution of the motion tracking engine 623. For example, the wearable device 210 may track motion (e.g., angular velocity of the head) of the head of the user wearing the wearable device 210 using the IMU 542 (e.g., the gyro sensor) of FIG. 5. For example, the wearable device 210 may obtain frames including eyes of the user using the camera 550 of FIG. 5. The wearable device 210 may track motion of the eye (or pupil) of the user from the frames, based on the execution of the motion tracking engine 623. The wearable device 210 may estimate a portion (e.g., the portion 240 of FIG. 2) in which the user gazes in the external space in which the wearable device 210 is included, based on the execution of the motion tracking engine 623. Based on the execution of the motion tracking engine 623, the wearable device 210 may identify at least one screen at which the user gazes.

The wearable device 210 according to an embodiment may execute the sound engine 624 in order to 'auralize' (simulate or model the experience of sound in a virtual space) information provided from the browser application 612. In a state in which the sound engine 624 is executed, the wearable device 210 may identify audio data provided from the browser application 612. Based on the audio data, the wearable device 210 may control a speaker in the wearable device 210 by executing the input/output driver 635. For example, the wearable device 210 may output an audio signal based on the audio data by controlling the speaker.

The wearable device 210 according to an embodiment may identify an input for controlling the wearable device 210 based on execution of the interface engine 626. For example, in a state in which the interface engine 626 is executed, the wearable device 210 may identify the input from the tracked motion using the motion tracking engine 623. The wearable device 210 may execute at least one function supported by the browser application 612 based on identifying the input. The at least one function may be a function for interacting with the user of the wearable device 210.

The wearable device 210 according to an embodiment may control communication between the wearable device 210 and an external electronic device based on execution of the communication engine 627. For example, in a state in which the communication engine 627 is executed, the wearable device 210 may control the communication driver 632 based on a URL provided from the browser application 612. Based on the control of the communication driver 632, the wearable device 210 may obtain a web page from the external electronic device matching the URL. The disclosure is not limited to the above example. The wearable device 210 may execute the communication engine 627 in order to establish a communication link between the external electronic device indicated by the program classified into the application/service layer 610, and the wearable device 210.

The wearable device 210 according to an embodiment may change a state of a process (or an instance) corresponding to the program classified into the application/service layer 610 based on execution of the context engine 625. The context engine 625 may be referred to as a context-aware engine. In an example, the wearable device 210 may change a state of a process corresponding to the browser application 612, among a first preset state in which the execution of the graphic engine 621 for a rendering based on the three dimensional coordinate system is permitted, or a second preset state in which the execution of the graphic engine 621 is at least partially restricted. The first preset state may include a state in which the three dimensional rendering by the GPU of the wearable device 210 is enabled, and the second preset state may include a state in which the three dimensional rendering by the GPU is disabled.

For example, in a state in which the context engine 625 is executed, the wearable device 210 may identify a portion of the external space in which the user gazes based on the motion tracked by the motion tracking engine 623. The wearable device 210 may execute at least one process corresponding to at least one screen matching the portion among different screens in the first preset state. The wearable device 210 may execute another process different from the at least one process in the second preset state.

As described above, as the CPU of the wearable device 210 according to an embodiment executes processes corresponding to the program classified into the application/service layer 610 by distinguishing the processes into the first preset state or the second preset state, the GPU may selectively perform a three dimensional rendering with respect to a specific process executed in a first preset state. Based on the selective performing of the three dimensional rendering, an amount of computation of the GPU of the wearable device 210 may be reduced. Since the amount of computation of the GPU is reduced, power consumption of the wearable device 210 including the GPU may be reduced or heat generation may be reduced.

Hereinafter, an example of an operation in which the CPU of the wearable device 210 switches a state of a process according to an embodiment will be described with reference to FIG. 7.

Figure 7:
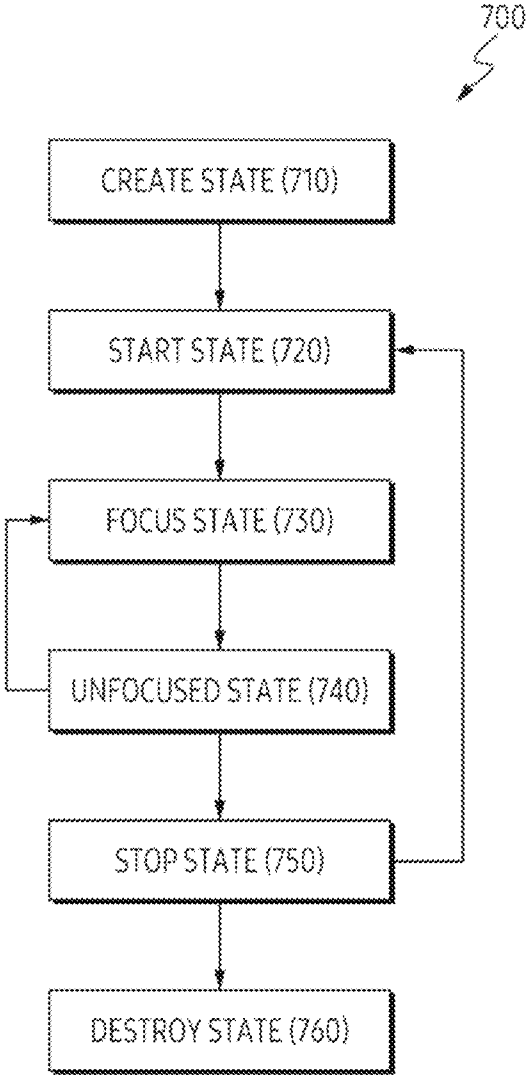
FIG. 7 illustrates an example of a state transition diagram of a process executed by a wearable device according to an embodiment.

FIG. 7 illustrates an example of a state transition diagram 700 of a process executed by a wearable device according to an embodiment. The wearable device of FIG. 7 may be an example of or may correspond to the wearable device 210 of FIG. 5. For example, the state transition diagram 700 of FIG. 7 may be an example of a sequence in which the processor 510 (e.g., the CPU 512) of FIG. 5 switches a state of the process.

Referring to FIG. 7, the state of the process executed by the wearable device may include a create state 710, a start state 720, a focus state 730, an unfocused state 740, a stop state 750, and a destroy state 760. Based on an input indicating execution of an application, the wearable device may create a process corresponding to the application. The create state 710 may include a state in which the wearable device creates the process in response to the input. In the create state 710, the wearable device may perform an operation for executing the process. For example, the wearable device may load at least one instruction associated with the application into a volatile memory of the wearable device. The create state 710 may be a state before a screen provided from the process is displayed.

Referring to FIG. 7, the wearable device according to an embodiment may switch the state of the process from the create state 710 to the start state 720. Based on completion of the operation for creating the process, the wearable device may change the state of the process to the start state 720. In the start state 720, the wearable device may display a screen associated with the process in a display (e.g., the display 530 of FIG. 5) by controlling the process based on a foreground. In the start state 720, the wearable device may perform a rendering with respect to one or more visual objects included in the screen. For example, while the rendering is performed, the wearable device may display an image of an application corresponding to the process. The image may include, for example, a screenshot of the application that was executed by the wearable device. The image may include, for example, an icon representing the application. Based on the rendering being completed, the wearable device may display a screen including one or more visual objects in the display. For example, the image displayed by the wearable device may be replaced with the screen.

Referring to FIG. 7, the wearable device according to an embodiment may switch the state of the process from the start state 720 to the focus state 730. Based on the rendering based on the start state 720 being completed, the wearable device may change the state of the process to the focus state 730. The focus state 730 may include a state in which the process is focused by a user. For example, the wearable device may execute a function for interacting with the user based on the process in the focus state 730. For example, the wearable device may occupy a resource (e.g., the CPU, the GPU, and/or the memory of the wearable device) of the wearable device as much as possible to execute the process in the focus state 730. For example, the wearable device may perform a rendering based on a three dimensional coordinate system by controlling a GPU based on the process in the focus state 730. Based on the three dimensional rendering, the wearable device may display a visual object included in the screen provided from the process in three dimensions. A first preset state described above with reference to FIG. 2 to FIG. 6 may include the focus state 730.

Referring to FIG. 7, in response to (or based on) an input indicating execution of an application, the wearable device may create a process corresponding to the application. Based on the input, the wearable device may sequentially switch the state of the process from the create state 710 to the focus state 730. For example, the wearable device may execute one or more processes in the first preset state (e.g., the focus state 730) in which the three dimensional rendering by the GPU is enabled using a CPU. For example, in a case that a plurality of processes are executed in the first preset state, the wearable device may display screens corresponding to each of the plurality of processes through the display. The wearable device according to an embodiment may identify motion towards at least one first screen among the screens by using a sensor. Based on identifying the motion, the wearable device may switch a state of at least one second process different from at least one first process corresponding to the at least one first screen into a second preset state that is different from the first preset state.

Referring to FIG. 7, the wearable device may conditionally switch the state of the process from the focus state 730 to the unfocused state 740. A state of a specific process being switched to the unfocused state 740 may mean that a different screen from a screen matching the specific process is focused by the user. The unfocused state 740 may include a state in which the wearable device does not identify a portion (e.g., the portion 350 of FIG. 2) in which the user gazes in a screen corresponding to the process. For example, based on whether the screen displayed based on the process is focused by the user, the wearable device may maintain the state of the process as the focus state 730, or switch to the unfocused state 740. While a plurality of screens corresponding to a plurality of processes in the focus state 730 are displayed to the user, the wearable device may identify, among the plurality of screens, one or more second screens different from the at least one first screen focused by the user. The wearable device may switch a state of one or more processes corresponding to the one or more second screens from the focus state 730 to the unfocused state 740.

While the wearable device according to an embodiment executes the process in the unfocused state 740, the wearable device may block interacting with the user based on the process. For example, while displaying a web page using the process in the unfocused state 740, the wearable device may not respond to a gesture to scroll the web page. The wearable device may restrictively occupy a resource of the wearable device in order to execute the process in the unfocused state 740. For example, the wearable device may at least partially restrict controlling the GPU based on the process in the unfocused state 740. Since controlling the GPU is at least partially restricted, the rendering based on the three dimensional coordinate system may be restricted or bypassed. Since the wearable device restricts the rendering based on the three dimensional coordinate system, the screen provided from the process may not include the visual object represented in three dimensions. Independently of restricting the rendering based on the three dimensional coordinate system, the wearable device may perform a rendering based on a two dimensional coordinate system based on the process in the unfocused state 740. For example, the screen provided from the process in the unfocused state 740 may include one or more visual objects rendered by the two dimensional coordinate system.

Referring to FIG. 7, the wearable device may conditionally switch the state of the process from the unfocused state 740 to the stop state 750. In the stop state 750, the wearable device may control the process based on a background. The wearable device may switch the state of the process to the stop state 750 based on time (e.g., duration) executing the process in the unfocused state 740. For example, based on identifying the process executed in the unfocused state 740 by exceeding a preset time, the wearable device may change the state of the process to the stop state 750. The process being executed in the unfocused state 740 by exceeding the preset time may mean that time when the user does not gaze at the screen corresponding to the process exceeds the preset time. The wearable device may switch the state of the process from the unfocused state 740 to the stop state 750, based on a direction, an angle, and/or the time interval of a gaze of the user wearing the wearable device. For example, in a case that the screen matching the process in the unfocused state 740 is spaced apart from an area formed along a preset angle with respect to the direction of the gaze of the user by exceeding the preset time, the wearable device may switch the state of the process from the unfocused state 740 to the stop state 750. An example of an operation in which the wearable device switches the state of the process based on the area formed along the preset angle with respect to the direction of the gaze will be described with reference to FIG. 9.

In an embodiment in which the wearable device displays a screen in three dimensions, the wearable device may change the state of the process corresponding to the screen to the stop state 750 based on a depth of the screen. The depth may mean a distance of the screen displayed through a displaying area of the display and/or binocular disparity with respect to the screen. For example, in a case that the depth of the screen corresponding to the process executed in the unfocused state 740 is increased to exceed a preset depth, the wearable device may change the state of the process to the stop state 750.

While executing the process in the stop state 750, the wearable device according to an embodiment may at least temporarily cease to display the screen corresponding to the process in the display. The wearable device may display an image (e.g., a screen shot) representing a screen at a moment of switching from the unfocused state 740 to the stop state 750 in the display. For example, while the state of the process is switched from the unfocused state 740 to the stop state 750, the wearable device may replace the screen corresponding to the process with the image representing the screen. For example, the wearable device may minimize a resource of the wearable device occupied to execute the process in the stop state 750. For example, the wearable device may refrain from executing a function (e.g., the function to interact with the user, the function to perform the rendering based the two dimensional coordinate system and/or the three dimensional coordinate system) of the process in the stop state 750. The second preset state described above with reference to FIG. 2 to FIG. 6 may include the unfocused state 740 and/or the stop state 750.

Referring to FIG. 7, the wearable device may conditionally switch the state of the process from the second preset state such as the unfocused state 740 and/or the stop state 750 to the first preset state (e.g., the focus state 730). For example, the wearable device may switch the state of the process from the second preset state to the first preset state based on identifying that the user gazes at the screen displayed by the process executed in the second preset state. Referring to FIG. 7, the wearable device may switch the state of the process from the unfocused state 740 to the focus state 730 based on identifying that the screen of the process executed in the unfocused state 740 is focused by the user. Referring to FIG. 7, based on identifying that the screen of the process executed in the stop state 750 is focused by the user, the wearable device may switch the state of the process from the stop state 750 to the start state 720.

Referring to FIG. 7, the wearable device according to an embodiment may conditionally switch the state of the process from the stop state 750 to the destroy state 760. The wearable device may switch the state of the process to the destroy state 760 based on an input indicating termination of the process. In the destroy state 760, the wearable device may remove at least one instruction for executing the process, loaded in a volatile memory, from the volatile memory. Based on the destroy state 760, the CPU of the wearable device may cease execution of an instruction based on the process. Based on the destroy state 760, the wearable device may remove the process.

As described above, the wearable device according to an embodiment may change the state of the process based on the state transition diagram 700 of FIG. 7. For example, the CPU of the wearable device may select the state of the process from among different states included in the state transition diagram 700. The wearable device may adaptively change a degree to which the resource of the wearable device is occupied by the process, by switching the state of the process executed to display the screen between the focus state 730 and the unfocused state 740. For example, the degree to which the resource is occupied by the process may depend on whether the screen corresponding to the process is focused by the user. The wearable device may assign more resources to a specific process corresponding to a specific screen focused by the user among a plurality of processes, than a resource used to execute another process different from the specific process. For example, the wearable device may preferentially perform a three dimensional rendering with respect to the specific screen focused by the user. For example, the wearable device may preferentially execute a function of a process corresponding to the specific screen focused by the user based on identifying interaction between the wearable device and the user.

Hereinafter, an example of an operation in which the wearable device performs a rendering with respect to at least one visual object included in a screen provided by a process, based on execution of the process in the focus state 730 to the unfocused state 740 will be described with reference to FIG. 8.

Figure 8:
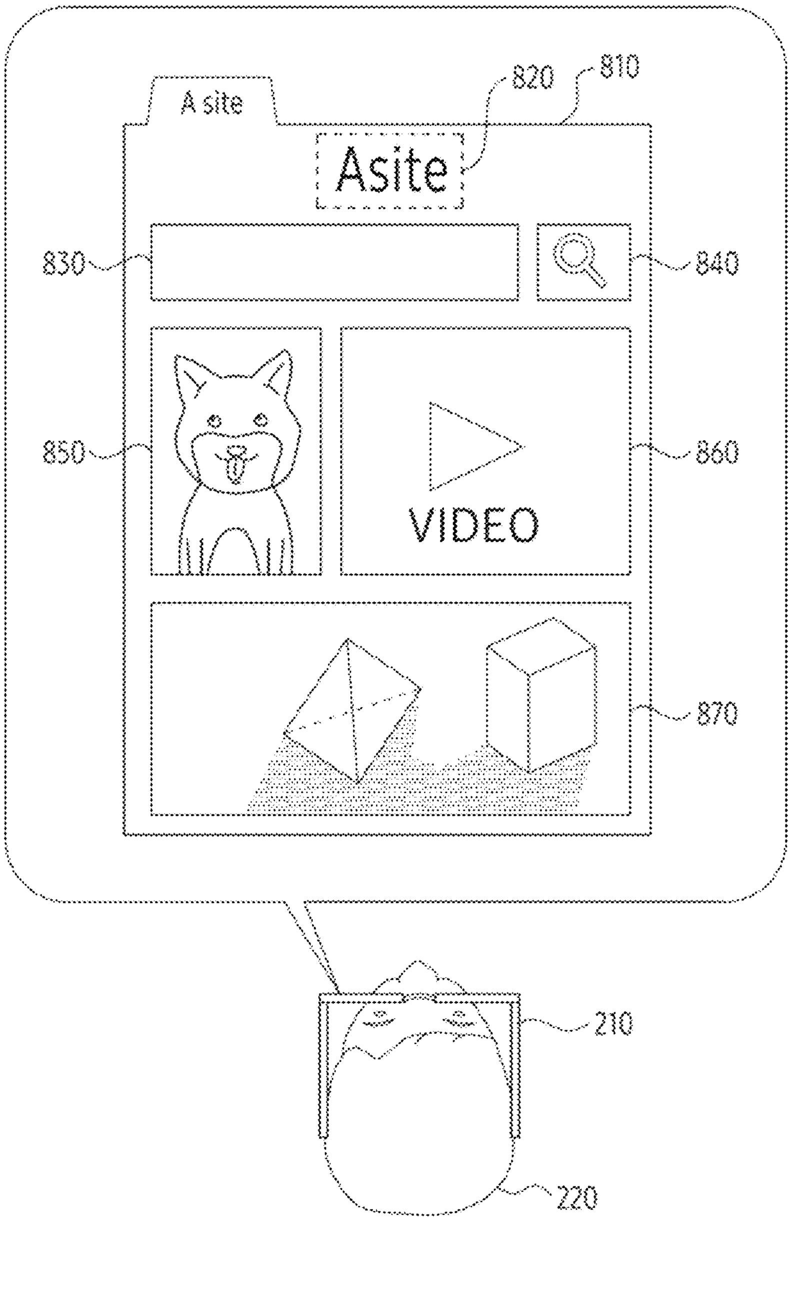
FIG. 8 illustrates an example of a screen displayed by a wearable device according to an embodiment, based on a rendering of visual objects.

FIG. 8 illustrates an example of a screen 810 displayed by a wearable device 210 according to an embodiment, based on a rendering of visual objects 820, 830, 840, 850, 860, and 870. The wearable device 210 of FIG. 8 may be an example of or may correspond to the wearable device 210 of FIG. 5.

FIG. 8 illustrates an example in which the wearable device 210 according to an embodiment displays a screen 810 including a web page to a user 220 by executing an application for browsing the web page (e.g., the web browser application 612 of FIG. 6). In response to an input indicating execution of the application, the wearable device 210 may create a process for executing one or more instructions included in the application. The wearable device 210 may change a state of the process based on the state transition diagram 700 of FIG. 7. For example, the wearable device 210 may display the screen 810 in a display (e.g., the display 530 of FIG. 5) of the wearable device 210, by sequentially changing the state from the create state 710 to the focus state 730 of FIG. 7. In FIG. 8, in the screen 810, one web page is displayed based on a single tab. In some other embodiments, there may be different layouts of the screen 810 in which the wearable device 210 displays by executing the application.

Referring to FIG. 8, in a state that the process based on the application for browsing the web page is executed, the wearable device 210 may display at least a portion of the web page in the screen 810 corresponding to the process. The web page may include one or more files (e.g., a file with a preset extension such as html, htm, css, js, php, asp, and/or jsp) received by the wearable device 210 from an external electronic device. A file for displaying the web page may include text based on a hypertext marked-up language (HTML). In a state in which the process is executed, the wearable device 210 may identify one or more tags distinguished by angle brackets (e.g., ‘<’ or ‘>’) within the file.

In a state of displaying the web page, the wearable device 210 according to an embodiment may identify one or more visual objects included in the web page. A visual object included in the web page may be classified by a tag within a file associated with the web page. The wearable device 210 may identify the one or more visual objects included in the web page based on a tag name (e.g., head, body, span, p, div, a, table, tr, td, img, or input) having the tag. The wearable device 210 may identify the one or more visual objects included in the web page based on an attribute included in the tag. The wearable device 210 may identify the one or more visual objects included in the web page based on a script code (e.g., JavaScript) connected to the tag. The wearable device 210 identifying the one or more visual objects may include an operation of identifying a type of the visual object.

Referring to FIG. 8, in the screen 810, the wearable device 210 may display the visual objects 820, 830, 840, 850, 860, and 870 indicated by different tags included in the web page. Hereinafter, based on an example of the web page displayed in the screen 810 of FIG. 8, an operation in which the wearable device 210 displays the visual objects 820, 830, 840, 850, 860, and 870 based on the different tags included in the file for displaying the web page is described. The wearable device 210 may identify a layout of the web page including the visual objects 820, 830, 840, 850, 860, and 870, based on a position of tags corresponding to each of the visual objects 820, 830, 840, 850, 860, and 870 and/or an inclusion relationship between the tags. For example, the inclusion relationship may be defined by a document object model (DOM).

Referring to FIG. 8, based on identifying a tag having a preset tag name (e.g., span and/or p) for displaying text in the file for displaying the web page, the wearable device 210 may display the visual object 820 including the text of the tag in the screen 810. In the file, based on identifying a tag having a preset tag name (e.g., img) for displaying an image, the wearable device 210 may display the visual object 850 including the image in the screen 810. For example, the wearable device 210 may obtain the image using a URL included in the tag corresponding to the visual object 850. In the file, based on identifying a tag to which a script code for displaying a video is connected, the wearable device 210 may display the visual object 860 including the video in the screen 810. In the file, based on identifying a tag having a preset tag name (e.g., input) for interacting with the user 220, the wearable device 210 may display the visual object 830 having a form of a text box in the screen 810. In the file, based on identifying a tag having a preset tag name for displaying a button, the wearable device 210 may display the visual object 840 having a form of the button in the screen 810. An icon included in the visual object 840 may be set by an attribute assigned to the tag corresponding to the visual object 840. In the file, based on identifying a tag to which a script code for a rendering based on a three dimensional coordinate system is connected, the wearable device 210 may identify an area for displaying the visual object 870 based on the three dimensional rendering in the screen 810.

The wearable device 210 according to an embodiment may perform a three dimensional rendering with respect to all of the visual objects 820, 830, 840, 850, 860, and 870 included in the screen 810 in a first preset state (e.g., the focus state 730 of FIG. 7). For example, the wearable device 210 may identify a script code (e.g., a preset script code associated with a shader) for controlling a GPU (e.g., the GPU 514 of FIG. 5) of the wearable device 210 from the tag corresponding to the visual object 870. The wearable device 210 may perform the three dimensional rendering with respect to the visual object 870 by controlling the GPU based on the script code. The screen 810 of FIG. 8 may be an example in which the wearable device 210 displays the visual object 870 in three dimensions based on the three dimensional rendering. For example, the wearable device 210 may display the screen 810 of FIG. 8 based on a process executed in the first preset state.

Based on whether the screen 810 is focused by the user 220, the wearable device 210 according to an embodiment may switch a state of a process corresponding to the screen 810 from the first preset state to a second preset state (e.g., the unfocused state 740 and/or the stop state 750 of FIG. 7). In the second preset state, the wearable device 210 may restrict (or bypass) a three dimensional rendering with respect to a visual object in a preset type among the visual objects 820, 830, 840, 850, 860, and 870 included in the screen 810. The preset type may include a visual object that requires a rendering based on the three dimensional coordinate system.

In an exemplary state of FIG. 8, while displaying the visual objects 820, 830, 840, 850, 860, and 870 based on tags set for displaying of the web page, the wearable device 210 may identify at least one visual object included in the preset type among the visual objects 820, 830, 840, 850, 860, and 870 based on a tag name and an attribute of the tags, or a script code associated with each of the tags. For example, since the tag corresponding to the visual object 870 is connected to the script code for controlling the GPU, the wearable device 210 may determine the visual object 870 as the visual object in the preset type. In the example, in the second preset state, the wearable device 210 may bypass, cease and/or restrict the three dimensional rendering associated with the visual object 870. In the second preset state, since the three dimensional rendering associated with the visual object 870 is ceased and/or restricted, the visual object 870 being displayed in three dimensions may be ceased.

According to an embodiment, disabling the three dimensional rendering with respect to a process in the second preset state by the wearable device 210 is not limited to restricting the rendering based on the three dimensional coordinate system, such as the visual object 870. For example, the wearable device 210 may cease to play the video included in the visual object 860, or may reduce resolution of the image included in the visual object 850. For example, the wearable device 210 may increase a period of the rendering with respect to the process in the second preset state, or may reduce a frame rate of the screen 810 corresponding to the process.

As described above, while displaying the screen 810 to the user 220, the wearable device 210 according to an embodiment may adaptively change a state of the process corresponding to the screen 810. Based on the change in the state of the process, the wearable device 210 may cease or restrict a three dimensional rendering with respect to at least one of the visual objects 820, 830, 840, 850, 860, and 870 included in the screen 810. For example, in a case that the user 220 gazes at a different screen from the screen 810, the wearable device 210 may cease to display the visual object 870 that requires the rendering based on the three dimensional coordinate system among the visual objects 820, 830, 840, 850, 860, and 870, or restrict the three dimensional rendering associated with the visual object 870. Since the three dimensional rendering requiring relatively much computation is ceased or restricted, the wearable device 210 may reduce an amount of computation required to display the screen 810 not focused by the user. Since the amount of computation is reduced, power consumption of the wearable device 210 may be reduced.

Hereinafter, referring to FIG. 9, motion of the user 220 in which the wearable device 210 according to an embodiment measures to identify at least one screen in which the user 220 gazes among a plurality of screens is exemplarily described.

Figure 9:
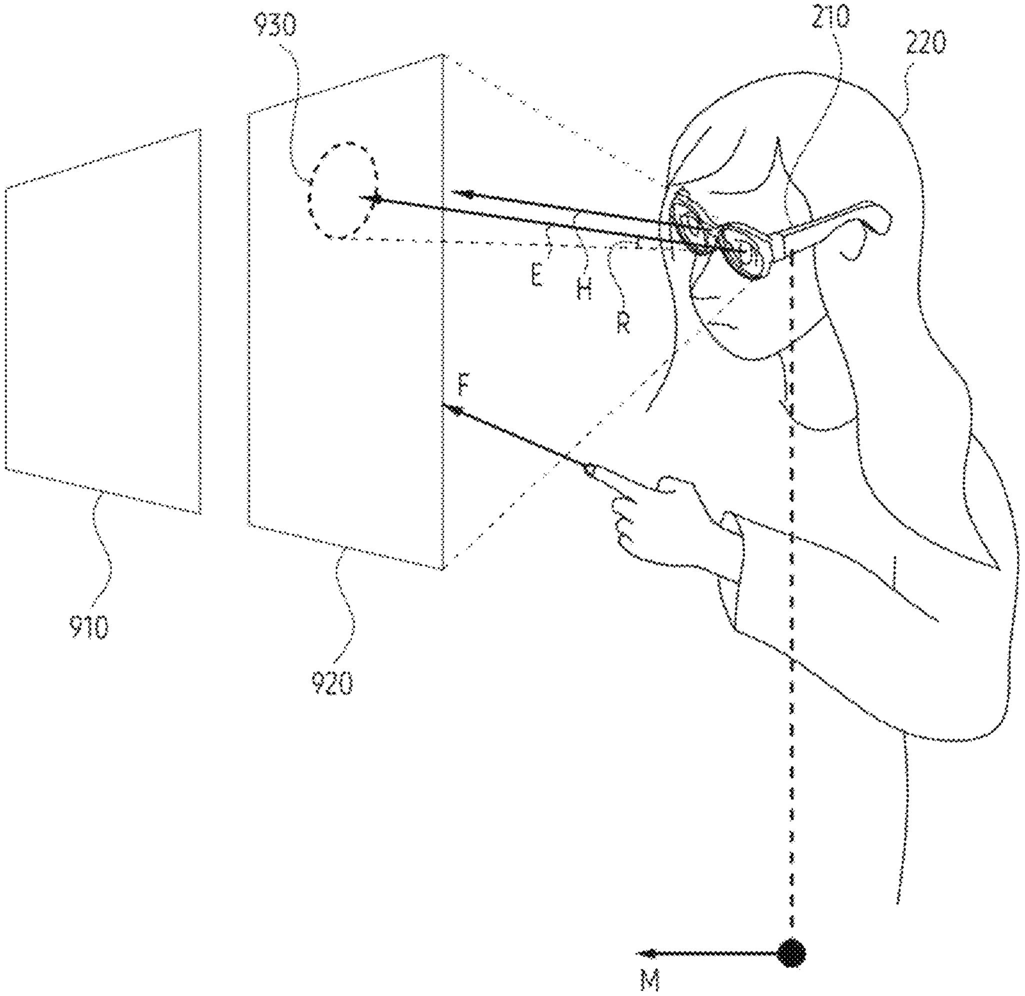
FIG. 9 illustrates an example of an operation in which a wearable device according to an embodiment obtains information based on motion of a user.

FIG. 9 illustrates an example of an operation in which a wearable device 210 according to an embodiment obtains information based on motion of a user 220. The wearable device 210 of FIG. 9 may be an example of the wearable device 210 of FIG. 5. The wearable device 210 according to an embodiment may identify the motion of the user 220 wearing the wearable device 210 using a sensor (e.g., the sensor 540 of FIG. 5) and/or a camera (e.g., the camera 550 of FIG. 5).

Referring to FIG. 9, the wearable device 210 according to an embodiment may identify a direction M in which the wearable device 210 and/or the user 220 moves based on a geographic location of the wearable device 210 identified through the sensor. The wearable device 210 may identify a direction H in which a head of the user 220 wearing the wearable device 210 towards based on data of an IMU (e.g., the IMU 542 of FIG. 5). In an embodiment, the direction H in which the head of the user 220 towards may mean a direction in which a face of the user 220 towards. In a state of being worn by the user 220, the wearable device 210 may identify a direction E of an eye using an image sensor (or a camera) disposed to face the eye of the user 220. In an embodiment, the direction E of the eye may mean a direction in which a pupil included in the eye towards. The wearable device 210 may identify a hand from frames of another image sensor (or a camera) having a different direction from the image sensor disposed toward the eye. The wearable device 210 may identify a direction F of at least one finger included in the hand based on a posture of the hand. The directions H, E, F, and M may be a direction of a body part of the user 220 using the sensor and/or the camera. For example, the wearable device 210 may obtain information indicating the direction (e.g., at least one of the directions H, E, F, and M) of the body part using the sensor.

The wearable device 210 according to an embodiment may selectively track any one of the direction H of the head or the direction E of the eye of the user in order to identify a direction in which the user 220 gazes. For example, in a case that azimuth angles of the direction H of the head and the direction E of the eye have a difference of less than about 65°, the wearable device 210 may identify the direction in which the user 220 gazes based on the direction H of the head. In a case that the azimuth angles have a difference of greater than or equal to about 65°, the wearable device 210 may identify the direction in which the user 220 gazes based on the direction E of the eye. However, an embodiment is not limited to the example.

The wearable device 210 according to an embodiment may identify a portion (e.g., a point of interest (POI) of the user 220) focused by the user 220 in a field-of-view (FoV) of the user 220 based on information indicating the direction of the body part. FIG. 9 illustrates, in a state in which screens 910 and 920 are displayed in the FoV of the user 220, an exemplary state in which the wearable device 210 identifies a portion 930 in which the user 220 gazes based on information indicating the direction E of the eyes of the user 220. The screens 910 and 920 may be provided by different processes executed by wearable device 210. The wearable device 210 may identify the portion 930 based on an angle range having the direction E of the eye as the center.

A size of the portion 930 in which the wearable device 210 according to an embodiment identifies may be associated with an angle range R having the direction H of the head or the direction E of the eye of the user 220 as the center. The wearable device 210 may change the angle range R based on a state of a battery (e.g., the battery 189 of FIG. 1) and/or memory (e.g., the memory 520 of FIG. 5) of the wearable device 210. For example, in a case that a state-of-charge (SOC) of the battery is less than or equal to a preset SOC, and/or usages of the memory exceeds preset usages, the wearable device 210 may set the angle range R to a relatively narrow angle range (e.g., about 10°) among preset angle ranges. For example, the angle range of about 10° may include an angle range in which the user 220 may recognize a character. In the example, in a case that the SOC exceeds the preset SOC and/or the usages is less than the preset usages, the wearable device 210 may set the angle range to a relatively wide angle range (e.g., about 30°) among the preset angle ranges. For example, the angle range of about 30° may include an angle range in which the user 220 may recognize a color. For example, a size of the portion 930 and/or the angle range may be at least partially proportional to the SOC of the battery of the wearable device 210. For example, the size of the portion 930 and/or the angle range may be at least partially inversely proportional to the usages of the memory of the wearable device 210.

Referring to FIG. 9, in an exemplary case in which the portion 930 focused by the user 220 superimposed with the screen 920, the wearable device 210 may execute a second process corresponding to the screen 920 in a first preset state, and a first process corresponding to the screen 910 in a second preset state. After a state of the first process is switched to the stop state 750 or the destroy state 760 of FIG. 7, the wearable device 210 may switch the state of the first process to another state (e.g., the focus state 730 or the start state 720) different from the stop state 750 and the destroy state 760 of FIG. 7 based on whether the direction in which the user 220 gazes is maintained within a preset range (e.g., 30° to 60°) from the screen 910 for a preset time (e.g., a time exceeding about one second). The wearable device 210 may change the state of the first process executed in the stop state 750 or the destroy state 760 based on a state of the battery and/or the memory of the wearable device 210 as well as the difference. The preset time may be proportional to the usages of the memory. For example, in a case that the usages of the memory exceed the preset usages, the wearable device 101 may change the preset time to a time (e.g., 10 seconds) longer than the exemplified 1 second. Similarly, in a case that the usages of the memory are less than or equal to the preset usages, the wearable device 101 may change the preset time to the exemplified one second.

For example, in a case that the difference is included in the preset range between about 30° and about 60°, the wearable device 210 may switch the state of the first process to the focus state 730 or the start state 720 of FIG. 7. For example, after switching the state of the first process to the start state 720 of FIG. 7, the wearable device 210 may switch the state of the first process from the start state 720 to the focus state 730 of FIG. 7 based on identifying that the difference is reduced to less than or equal to about 30°. In the example, in a case that the SOC of the battery of the wearable device 210 is less than or equal to the preset SOC, the wearable device 210 may switch the state of the first process from the start state 720 to the focus state 730 based on identifying that the difference is maintained to less than or equal to about 30° within a time interval exceeding the preset time (e.g., duration).

In an embodiment, an operation in which the state of the first process and the second process is changed based on the directions H and E of the body part of the user 220. However, embodiments of the disclosure are not limited thereto. For example, in case of being incapable of identifying the direction H of the head or the direction E of the eye of the user 220, the wearable device 210 may identify the portion 930 in which the user 220 gazes based on the direction F of the finger, or the direction M in which the user 220 moves. The wearable device 210 according to an embodiment may change the state of the first process and/or the second process based on depths of the screens 910 and 920 in the FoV. For example, in a case that a depth of the screen 920 exceeds a preset depth even though the portion 930 in which the user 220 gazes is superimposed with the screen 920, the wearable device 210 may execute the second process corresponding to the screen 920 in the second preset state. For example, the preset depth may be set by an eyesight of the user 220 and/or an application installed in the wearable device 210.

As described above, the wearable device 210 according to an embodiment may identify at least one screen focused by the user 220 among the screens 910 and 920 based on a direction of a preset body part. In an embodiment, the wearable device 210 may change the size of the portion 930 used to identify the at least one screen based on the state of the battery and/or the memory of the wearable device 210. For example, in a case that the wearable device 210 changes the size of the portion 930 in proportion to the SOC of the battery, as the SOC of the battery is larger, the size of the portion 930 increases, so the number of processes executed in the first preset state may increase. In the example, since the size of the portion 930 decreases as the SOC of the battery is smaller, the number of processes executed in the first preset state may decrease as the SOC of the battery is included in the portion 930. The wearable device 210 may reduce a resource of the wearable device 210 by adjusting the number of processes, executed in the first preset state, in which a rendering based on a three dimensional coordinate system is enabled, based on the SOC of the battery and/or the usages of the memory.

Hereinafter, an example of an operation in which the wearable device 210 adjusts a state of each of screens based on motion of the user 220 will be described with reference to FIG. 10A to FIG. 10D.

FIG. 10A to FIG. 10D illustrate an example of an operation in which a wearable device 210 according to an embodiment adjusts a state of each of screens 1010, 102, and 1030 based on motion of a user. The wearable device 210 of FIG. 10A to FIG. 10D may be an example of the wearable device 210 of FIG. 5.

Figure 10A:
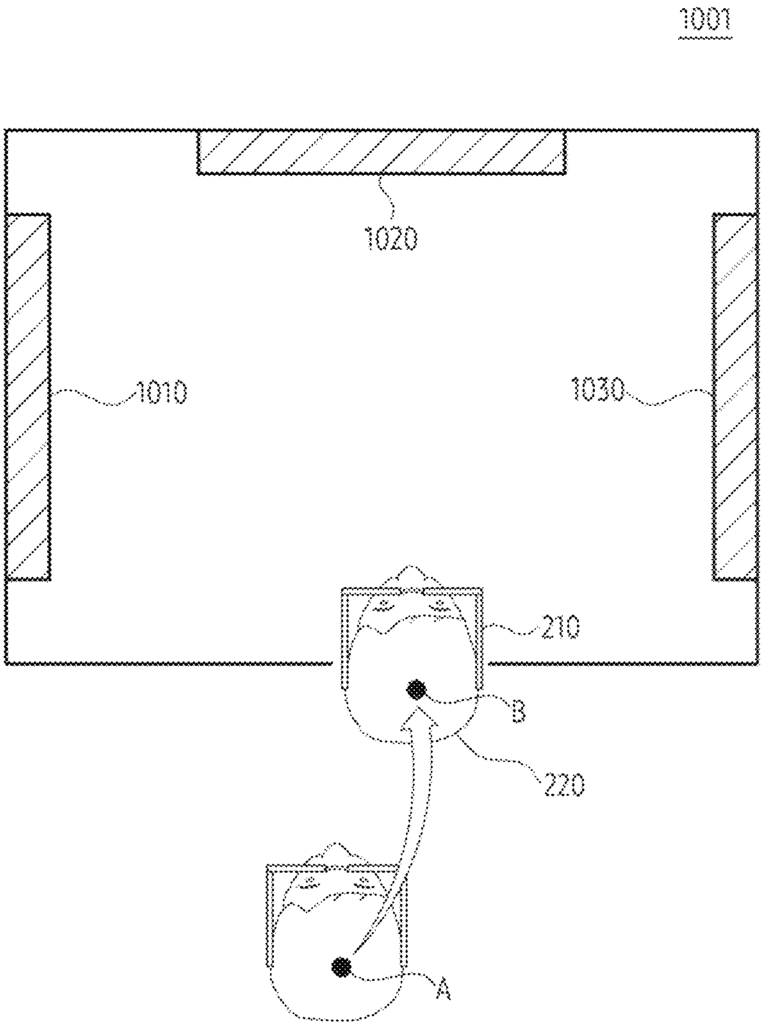
FIG. 10A, FIG. 10B, FIG. 10C, and FIG. 10D illustrate an example of an operation in which a wearable device according to an embodiment adjusts a state of each screen based on motion of a user.

FIG. 10A illustrates an exemplary state 1001 in which a user 220 wearing the wearable device 210 moves from a point A to a point B. In the state 1001, the wearable device 210 according to an embodiment may identify that the wearable device 210 enters in an external space for displaying the screens 1010, 1020, and 1030 based on the perception engine 622 and/or the context engine 625 of FIG. 6. In an embodiment, the screens 1010, 1020, and 1030 may have been registered by an input for registering the screens 1010, 1020, and 1030 in the external space. For example, in another state before the state 1001, the wearable device 210 may recognize the external space. In the other state before the state 1001, the wearable device 210 may identify the input for registering the screens 1010, 1020, and 1030 in the recognized external space. Identifying that the wearable device 210 enters in the external space may be performed based on a GPS sensor in the wearable device 210 and/or a geofence (a virtual boundary around a real-world location) formed with respect to the external space. In an embodiment, in a case that the wearable device 210 is moved from the external space to an area less than a preset distance, the wearable device 210 may perform a rendering with respect to the screens 1010, 1020, and 1030 in advance.

For example, the wearable device 210 recognizing a movement of the user 220 may be performed based on the motion tracking engine 623 of FIG. 6. Based on identifying a position of the wearable device 210 moved to the point B, the wearable device 210 may create processes corresponding to each of the screens 1010, 1020, and 1030. For example, the wearable device 210 may sequentially switch states of the processes from the create state 710 of FIG. 7 to the unfocused state 740. However, embodiments of the disclosure are not limited thereto, and the wearable device 210 may maintain the states of the processes in the start state 720 of FIG. 7. In the point B, the wearable device 210 may identify external objects to be used for displaying the screens 1010, 1020, and 1030 provided from the plurality of processes based on the perception engine 622 of FIG. 6. For example, in the state 1001 of FIG. 10A in which the user 220 moves to the point B, which is an entrance of the external space having a form of a room, the wearable device 210 may match the screens 1010, 1020, and 1030 to each of wall surfaces of the room. The wearable device 210 may store data that matches planes (e.g., the wall surfaces) recognized from the external space and the screens 1010, 1020, and 1030, within spatial information with respect to the external space. In the point B, the wearable device 210 may display the screens 1010, 1020, and 1030 in a displaying area of a display.

Figure 10B:
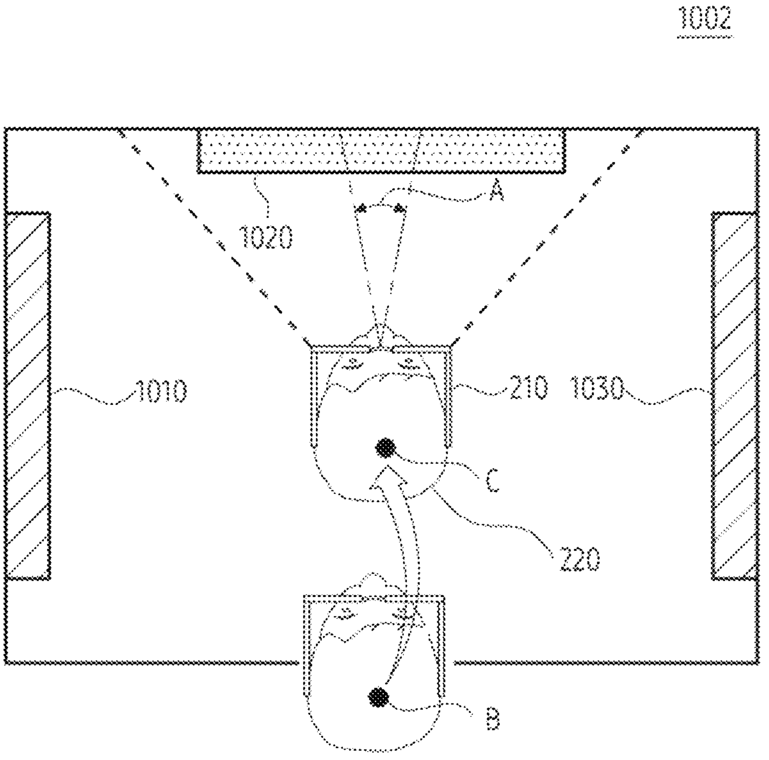

FIG. 10B illustrates an exemplary state 1002 in which the user 220 wearing the wearable device 210 moves from the point B, which is the entrance of the external space having the form of the room, to a point C inside the external space. In the state 1002, the wearable device 210 may identify the screen 1020 focused by the user 220 among the screens 1010, 1020, and 1030 based on a direction of a head or a direction of an eye of the user. For example, the wearable device 210 may identify a portion focused by the user 220 using an area formed based on an angle range A with respect to the direction of the head. For example, the wearable device 210 may identify the direction of the head or the direction of the eye of the user 220 based on execution of the motion tracking engine 623 of FIG. 6.

In the state 1002 of FIG. 10B, based on identifying the screen 1020 focused by the user 220 the wearable device 210 may perform a three dimensional rendering with respect to one or more visual objects included in the screen 1020 based on execution of a graphic engine 621. For example, the wearable device 210 may switch a state of a process corresponding to the screen 1020 to a first preset state (e.g., the focus state 730 of FIG. 7). Based on the process executed in the first preset state, the wearable device 210 may display at least one visual object included in the screen 1020 in three dimensions. In the point C, the wearable device 210 may execute at least one function provided from the process corresponding to the screen 1020 based on a gesture of the user 220. In the point C, the wearable device 210 may maintain states of processes corresponding to other screens 1010 and 1030 different from the screen 1020 in a second preset state (e.g., the unfocused state 740 of FIG. 7). For example, in a case that the user 220 gazing at the screen 1020 performs a gesture associated with the screens 1010 and 1030, the wearable device 210 may refrain from executing a function corresponding to the gesture.

Figure 10C:
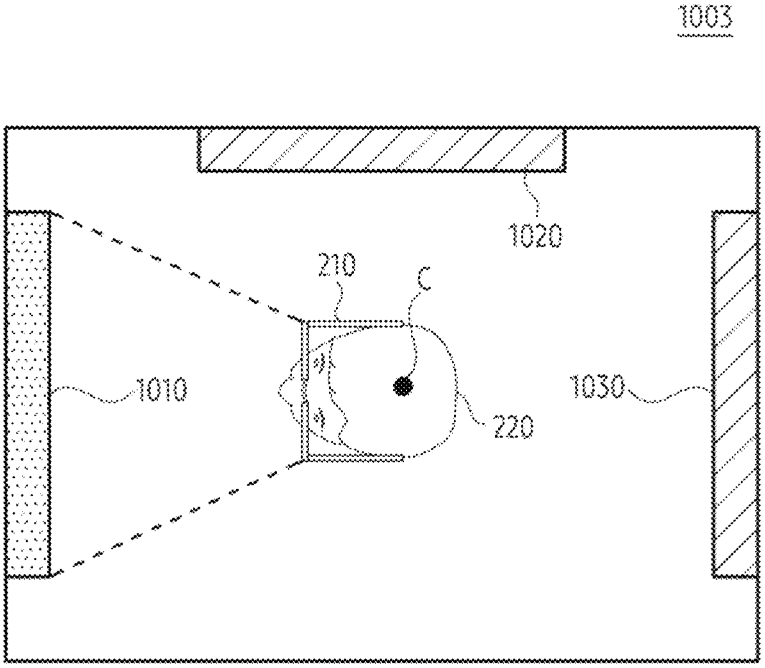

FIG. 10C illustrates an exemplary state 1003 in which the user 220 wearing the wearable device 210 rotates towards the screen 1010 from the screen 1020 in the point C. According to an embodiment, in the state 1003, based on identifying that the user 220 gazes at the screen 1010, the wearable device 210 may switch a state of a process corresponding to the screen 1010 to the first preset state. For example, based on identifying that the user 220 gazes at the screen 1010 for about 1 second or more, the wearable device 210 may switch the state of the process with respect to the screen 1010 to the first preset state. The wearable device 210 may switch the state of a process corresponding to other screens 1020 and 1030 different from the screen 1010 to the second preset state. In an embodiment, the wearable device 210 may change a state of a process that is executed by exceeding a preset duration in the second preset state, or corresponding to a screen that is invisible by the user 220, to the stop state 750 of FIG. 7. The wearable device 210 changing states of each of the screens 1010, 1020, and 1030 may be performed based on execution of the context engine 625 of FIG. 6.

Figure 10D:
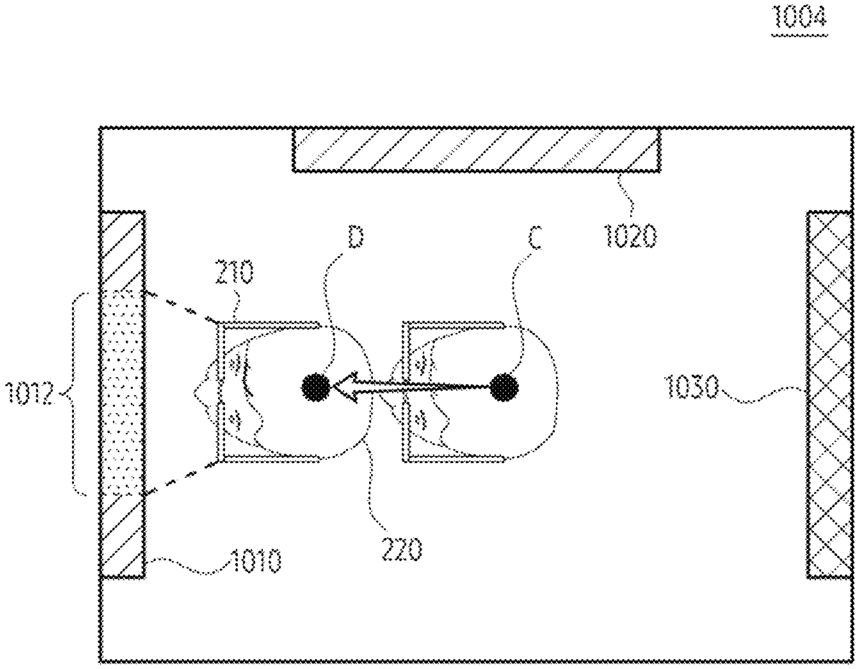

FIG. 10D illustrates an exemplary state 1004 in which the user 220 wearing the wearable device 210 moves from the point C to a point D between the point C and the screen 1010. For example, the wearable device 210 may identify that user 220 approaches the screen 1010. Since the user 220 approaches the screen 1010, a size of an area in the screen 1010 in which the user 220 gazes may be reduced to a size smaller than that of the screen 1010, such as a portion 1012. Based on identifying that the portion 1012 included in the screen 1010, which is included in the FoV of the user 220, and is another portion of the screen 1010 different from the portion 1012, moves outside FoV, the wearable device 210 according to an embodiment may increase resolution and/or a frame rate of the portion 1012 compared to resolution and/or a frame rate of the other portion in the screen 1010. For example, the wearable device 210 may increase the frame rate of the portion 1012 from 60 frames per second (fps) to 120 fps. However, embodiments of the disclosure are not limited thereto, and the wearable device 210 may reduce the resolution and/or the frame rate of the other portion compared to the resolution and/or the frame rate of the portion 1012.

As described above, the wearable device 210 according to an embodiment may change the states of the screens 1010, 1020, and 1030 displayed through the display of the wearable device 210, and/or the processes corresponding to the screens 1010, 1020, and 1030, based on a moving direction of the user 220 and/or a direction of a gaze of the user 220. For example, the wearable device 210 may reduce a resource (e.g., a GPU of the wearable device 210) used for a three dimensional rendering of another screen, distinguished from at least one screen focused by the user 220. For example, the wearable device 210 may exclusively process interaction between the wearable device 210 and the user 220 using at least one process corresponding to the at least one screen focused by the user 220.

Hereinafter, an example of operations in which the wearable device 210 according to an embodiment performs for a rendering associated with the screens 1010, 1020, and 1030 will be described with reference to FIG. 11 to FIG. 13.

Figure 11:
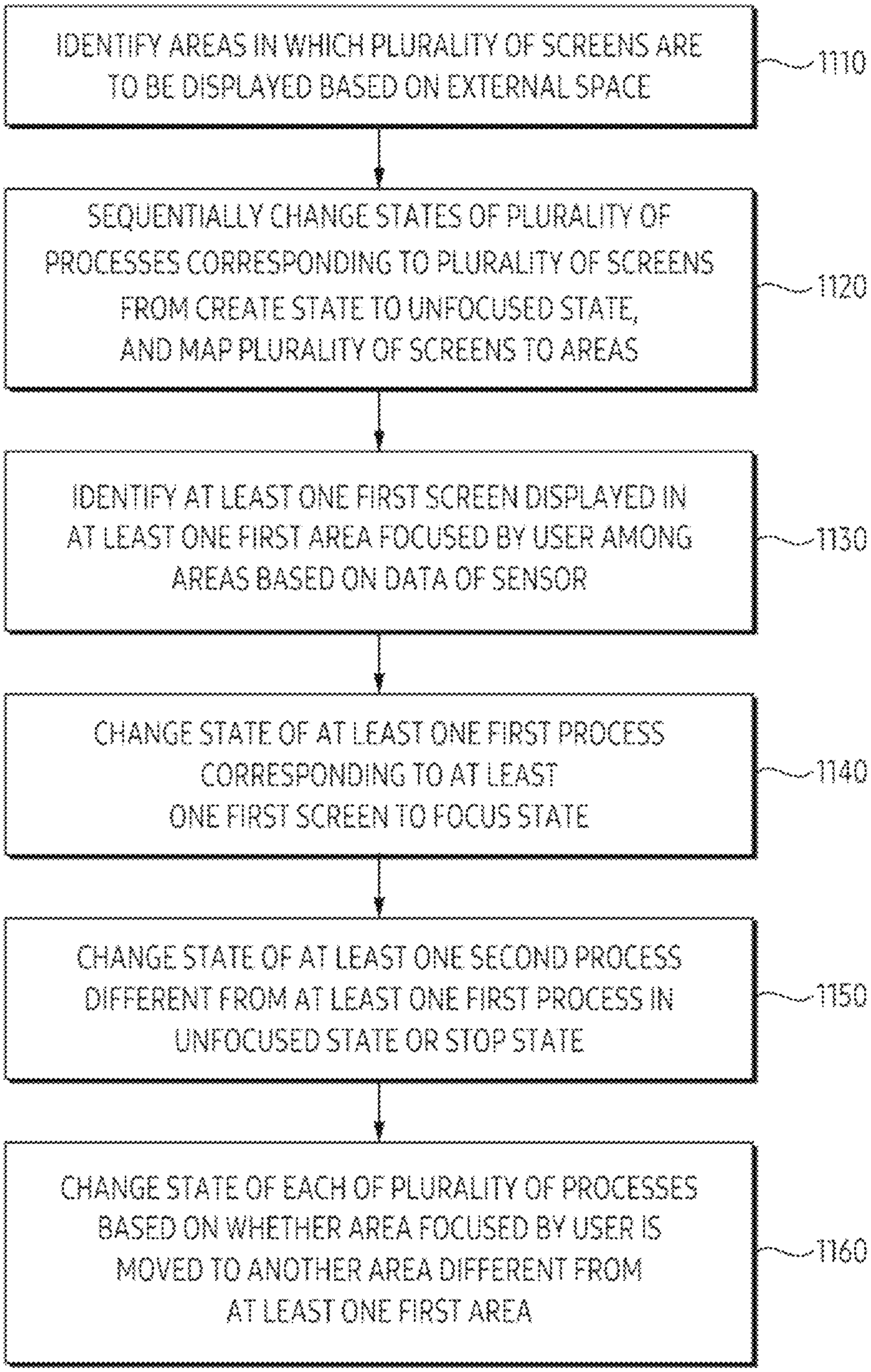
FIG. 11 illustrates an example of a flowchart with respect to a wearable device according to an embodiment.

FIG. 11 illustrates an example of a flowchart with respect to a wearable device according to an embodiment. The wearable device of FIG. 11 may include the wearable device 210 of FIG. 2 to FIG. 9, and FIG. 10A to FIG. 10D. An operation of FIG. 11 may be performed by the wearable device 210 of FIG. 5 and/or the processor 510 of FIG. 5.

Referring to FIG. 11, in operation 1110, the wearable device according to an embodiment may identify areas in which a plurality of screens are to be displayed based on an external space. The wearable device may perform the operation 1110 in response to an input indicating execution of a plurality of processes (or instances) corresponding to each of the plurality of screens. The wearable device may obtain information with respect to the external space including the wearable device using a camera (e.g., the camera 550 of FIG. 5). The wearable device may identify, from frames of the camera, areas for synthesizing each of the plurality of screens, such as the wall surfaces 231, 232, and 233 of FIG. 2. The wearable device may perform the operation 1110 of FIG. 11 based on execution of the context engine 625 and/or the perception engine 622 of FIG. 6.

Referring to FIG. 11, in operation 1120, the wearable device according to an embodiment may sequentially change states of the plurality of processes corresponding to the plurality of screens from a create state to an unfocused state, and map the plurality of screens to the areas. For example, the wearable device may sequentially change the states of the plurality of processes from the create state 710 to the unfocused state 740 of FIG. 7. For example, the wearable device may identify the plurality of screens provided from the plurality of processes by executing the plurality of processes in the start state 720 or the unfocused state 740 of FIG. 7. The wearable device may map the plurality of screens to the identified areas based on the operation 1110. Based on the mapping between the areas and the plurality of screens, the wearable device may display the plurality of screens in a displaying area of a display (e.g., the display 530 of FIG. 5).

Referring to FIG. 11, in operation 1130, the wearable device according to an embodiment may identify at least one first screen displayed in at least one first area focused by a user (e.g., the user 220 of FIG. 2 to FIG. 9, FIG. 10A to FIG. 10D) among the areas of the operation 1110, based on data of a sensor. The wearable device may identify the at least one first area based on a direction (e.g., the directions H, E, F, and M of FIG. 9) of a body part (e.g., a head, an eye, and/or a finger) of the user wearing the wearable device. For example, the wearable device may identify the at least one first area based on an angle range associated with an SOC of a battery and/or usages of memory.

Referring to FIG. 11, in operation 1140, the wearable device according to an embodiment may change a state of at least one first process corresponding to the at least one first screen to a focus state. The wearable device may execute the at least one first process in a first preset state including the focus state 730 of FIG. 7 based on the operation 1140. Since the state of the at least one first process is changed to the focus state, the wearable device may display the at least one first screen in a state in which a three dimensional rendering based on a GPU (e.g., the GPU 514 of FIG. 5) is enabled. For example, based on the operation 1140, the wearable device may display at least one visual object included in the at least one first screen in three dimensions. Since it is allowed to interact with the user based on a process in the focus state, the wearable device may execute a function for interacting with the user, among functions of the at least one first process.

Referring to FIG. 11, in operation 1150, the wearable device according to an embodiment may change a state of at least one second process different from the at least one first process in the unfocused state or a stop state. For example, the wearable device may change the state of the at least one second process to the stop state, based on a duration in which the at least one second process is executed in the unfocused state, a positional relationship (e.g., a direction and/or a distance of a gaze of the user) between a screen corresponding to the at least one second process and the user. In case of changing to the stop state, the wearable device may replace a screen corresponding to a specific process executed in the stop state with an image. For example, the image may include a screen shot corresponding to the specific process in the unfocused state. In the unfocused state and the stop state, since interacting with the user based on the process is restricted, the wearable device may cease a function for interacting with the user among functions of the at least one second process.

Referring to FIG. 11, in operation 1160, the wearable device according to an embodiment may change a state of each of the plurality of processes based on whether an area focused by the user is moved to another area different from the at least one first area. The wearable device may identify that the area focused by the user is moved based on the data of the sensor. For example, in a case that the area focused by the user is moved to the other area, the wearable device may switch a state of a process corresponding to another screen mapped to the other area to the focus state.

Figure 12:
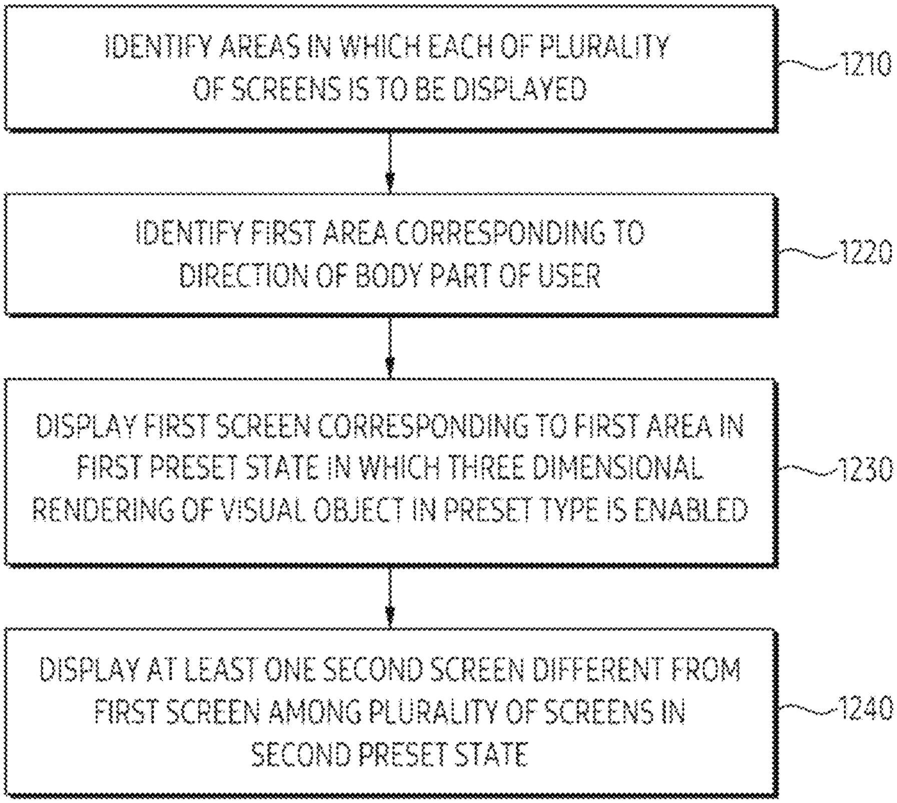
FIG. 12 illustrates an example of a flowchart with respect to a wearable device according to an embodiment.

FIG. 12 illustrates an example of a flowchart with respect to a wearable device according to an embodiment. The wearable device of FIG. 12 may include the wearable device 210 of FIG. 2 to FIG. 9, and FIG. 10A to FIG. 10D. An operation of FIG. 12 may be performed by the wearable device 210 of FIG. 5 and/or the processor 510 of FIG. 5. At least one of operations of FIG. 12 may be associated with at least one of the operations of FIG. 11.

Referring to FIG. 12, in operation 1210, the wearable device according to an embodiment may identify areas in which each of a plurality of screens is to be displayed. The wearable device may perform the operation 1210 of FIG. 12 similar to the operation 1110 of FIG. 11. The wearable device may obtain information for adjusting a shape and/or a position of the plurality of screens in a displaying area of a display based on a shape and/or a direction of external objects (e.g., the wall surfaces 231, 232, and 233) included in an external space.

Referring to FIG. 12, in operation 1220, the wearable device according to an embodiment may identify a first area corresponding to a direction of a body part of a user. For example, the wearable device may identify a direction of a head, an eye, and/or a finger of the user based on data of a sensor (e.g., the sensor 540 of FIG. 5). For example, the wearable device may identify the first area based on an angle range that is based on a state of a battery and/or memory of the wearable device and have the direction as the center. For example, the angle range may be associated with an SOC of the battery and/or usages of the memory. The first area may be identified in the displaying area of the display, such as the portion 240 of FIG. 2 and/or the portion 930 of FIG. 9, or may be identified in the external space recognized by the wearable device.

Referring to FIG. 12, in operation 1230, the wearable device according to an embodiment may display a first screen corresponding to the first area in a first preset state in which a three dimensional rendering of a visual object in a preset type is enabled. For example, the first preset state may include the focus state 730 of FIG. 7. In an embodiment, in the first preset state, the wearable device may execute a function matched to an input among functions of a process corresponding to the first screen in response to identifying the input with respect to the first screen. The input may include interaction (e.g., a gesture of the user associated with the first screen) of the user with respect to the first screen. In the first preset state, the wearable device may display the visual object in the preset type in three dimensions by performing the rendering based on a three dimensional coordinate system. The visual object of the operation 1230 may include the visual object 250 of FIG. 2 and/or the visual object 870 of FIG. 8.

Referring to FIG. 12, in operation 1240, the wearable device according to an embodiment may display at least one second screen that is different from the first screen among the plurality of screens in a second preset state. For example, the second preset state may include the unfocused state 740 and/or the stop state 750 of FIG. 7. In the second preset state, independently of identifying an input with respect to the at least one second screen, the wearable device may refrain from executing a function matched to the input, among functions of at least one process corresponding to the at least one second screen. In the second preset state in which the three dimensional rendering of the visual object in the preset type is disabled, the wearable device may restrict displaying of the visual object in the preset type included in the at least one second screen. In an embodiment, the preset type may be set to classify a visual object requiring the three dimensional rendering. For example, the at least one second screen displayed by the operation 1240 may not include the visual object based on the three dimensional coordinate system.

Figure 13:
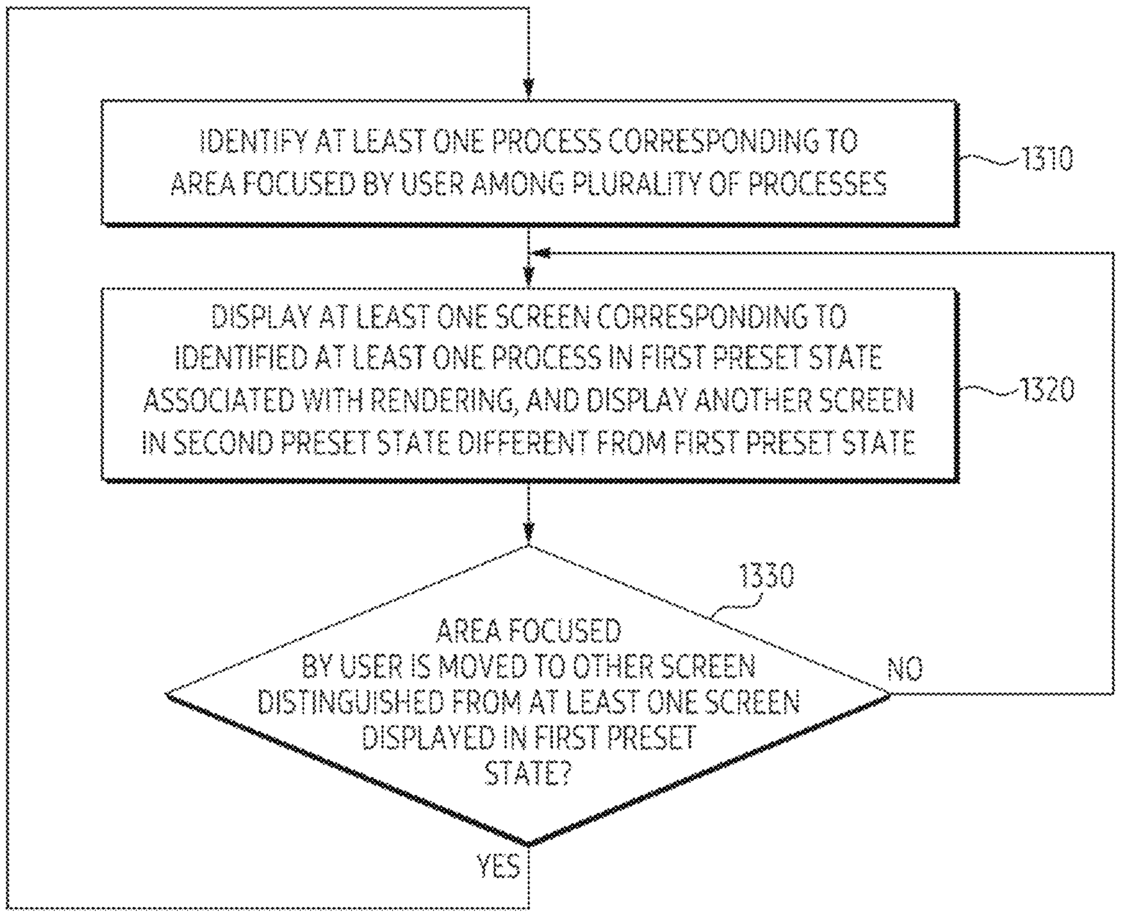
FIG. 13 illustrates an example of a flowchart with respect to an electronic device according to an embodiment.

FIG. 13 illustrates an example of a flowchart with respect to an electronic device according to an embodiment. A wearable device of FIG. 13 may include the wearable device 210 of FIG. 2 to FIG. 9, and FIG. 10A to FIG. 10D. An operation of FIG. 13 may be performed by the wearable device 210 of FIG. 5 and/or the processor 510 of FIG. 5. Operations of FIG. 13 may be associated with at least one of the operations of FIG. 11 to FIG. 12.

Referring to FIG. 13, in operation 1310, the wearable device according to an embodiment may identify at least one process corresponding to an area focused by a user among a plurality of processes. The area may include the portion 930 of FIG. 9. For example, the wearable device may identify the area focused by the user based on a direction (e.g., the directions H, E, F, and M of FIG. 9) of a body part identified using a sensor (e.g., the sensor 540 of FIG. 5) and/or a camera (e.g., the camera 550 of FIG. 5). For example, the wearable device may identify the area focused by the user based on a state of a battery and/or memory of the wearable device. The wearable device may identify at least one process of the operation 1310 based on at least one screen superimposed with the area, among screens matching each of the plurality of processes.

Referring to FIG. 13, in operation 1320, the wearable device according to an embodiment may display the at least one screen corresponding to the at least one process identified based on the operation 1310, in a first preset state associated with a rendering (e.g., a three dimensional rendering), and display another screen in a second preset state that is different from the first preset state. The first preset state may include a state in which interaction between the wearable device and the user is permitted. The wearable device may perform the operations 1310 and 1320 of FIG. 13 based on the operations 1130, 1140, and 1150 of FIG. 11. For example, the at least one screen corresponding to the at least one process corresponding to the area focused by the user may be displayed in the first preset state in which the three dimensional rendering and/or the interaction are permitted. The other screen distinguished from the at least one screen may be displayed in the second preset state in which the three dimensional rendering and the interaction are restricted.

Referring to FIG. 13, in operation 1330, the wearable device according to an embodiment may determine whether the area focused by the user is moved to the other screen distinguished from the at least one screen displayed in the first preset state. For example, the wearable device may identify a movement of the area focused by the user based on at least one of the direction of the body part, the state of the battery and/or the memory in the wearable device. In a case that the area focused by the user is not moved to the other screen (1330—NO), the wearable device may maintain displaying the screens based on states set by the operation 1320. In a case that the area focused by the user is moved to the other screen (1330—YES), the wearable device may perform the operation 1310 again to identify at least one process corresponding to the moved area. Based on the identified at least one process, the wearable device may change a state of screens corresponding to each of the processes.

As described above, the wearable device according to an embodiment may control a rendering with respect to screens displayed through different areas in a displaying area of a display based on whether each of the screens is focused by the user. At least one first screen focused by the user may be rendered in a state in which access with respect to a resource of the wearable device is permitted. One or more second screens different from the at least one first screen may be conditionally permitted to access the resource, or rendered in another state that is at least partially restricted. The wearable device may control the rendering with respect to each of the screens and/or reactivity of the screens by adjusting states of processes (or instances) corresponding to each of the screens.

In an embodiment, a method of conditionally performing a rendering performed by a wearable device to display each of a plurality of screens may be required. As described above, a wearable device (e.g., the wearable device 210 of FIG. 2 to FIG. 9, and FIG. 10A to FIG. 10D) according to an embodiment may comprise a display (e.g., the display 530 of FIG. 5), a sensor (e.g., the sensor 540 of FIG. 5), and a processor (e.g., the processor 510 and/or the CPU 512 of FIG. 5). The processor may be configured to identify, in a displaying area of the display, areas in which each of a plurality of screens is displayed. The processor may be configured to identify, based on a direction of a body part of a user (e.g., the user 220 of FIG. 2 to FIG. 9, and FIG. 10A to FIG. 10D) wearing the wearable device that is identified by data of the sensor, a first area among the areas corresponding to the direction. The processor may be configured to display, based on identifying the first area, a first screen corresponding to the first area in a first preset state among distinct states distinguished by whether interaction associated with a screen is permitted, and display at least one second screen that is different from the first screen in a second preset state that is different from the first preset state. According to an embodiment, the wearable device may reduce an amount of computation by selectively performing a rendering with respect to at least one screen matching the direction of the body part of the user among a plurality of screens.

For example, the processor may be configured to display the at least one second screen in the second preset state in which a rendering of a visual object based on a three dimensional coordinate system in a screen is disabled.

For example, the processor may be configured to execute a first process corresponding to the first screen in the first preset state in which execution of at least one function to interact with the user is permitted, among functions executable by a process corresponding to a screen.

For example, the processor may be configured to execute at least one second process corresponding to the at least one second screen in the second preset state in which the execution of the at least one function to interact with the user is ceased.

For example, the processor may be configured to identify, among the at least one second screen, a screen displayed to be longer than a preset duration in the second preset state. For example, the processor may be configured to display an image representing the screen in an area among the areas where the identified screen is displayed.

For example, the processor may be configured to identify, based on a plurality of tags included in a web page included in the first screen, the visual object in a preset type.

For example, the processor may be configured to identify at least one tag indicating the visual object in the preset type based on at least one of a tag name of each of the plurality of tags, attributes respectively included in the plurality of tags, or script codes respectively coupled to the plurality of tags.

For example, the wearable device may further comprise another processor different from the processor. The processor may be configured to, based on identifying a preset script code associated with a shader executed by the another processor, select a tag associated with the preset script code among the plurality of tags as a tag indicating the visual object in the preset type.

For example, the wearable device may further comprise a battery. The processor may be configured to obtain information indicating the direction of the body part including an eye of the user using the sensor. The processor may be configured to, based on the direction indicated by the information, and an angle range set by a state of charge (SOC) of the battery, select at least one area among the areas.

For example, the processor may be configured to, based on identifying the SOC greater than a preset threshold, select at least one area among the areas based on a first angle range. The processor may be configured to, based on identifying the SOC less than or equal to the preset threshold, select at least one area among the areas based on a second angle range narrower than the first angle range.

As described above, a method of a wearable device according to an embodiment may comprise switching, using a first processor in the wearable device, states of a plurality of processes from a first preset state in which a three dimensional rendering by a second processor different from the first processor is enabled, to a second preset state. The method may comprise, while displaying screens respectively corresponding to the plurality of processes through a display in the wearable device, identifying motion towards at least one first screen among the screens using a sensor in the wearable device. The method may comprise switching, based on identifying the motion, a state of at least one first process corresponding to the at least one first screen, to the first preset state from the second preset state. The method may comprise executing, based on the at least one first process executed in the first preset state, at least one function for interaction.

For example, the executing may comprise displaying each of the screens in distinct areas in the display.

For example, the identifying the motion may comprise identifying the motion associated with a gaze of a user wearing the wearable device based on data of the sensor.

For example, the method may comprise performing, based on the second preset state in which a rendering based on the second processor is disabled, a rendering with respect to visual objects included in the at least one second screen.

For example, the executing may comprise executing, based on the at least one first process executed in the first preset state in which the interaction between the user and the wearable device is permitted, the at least one function for the interaction.

As described above, a method of a wearable device according to an embodiment may comprise identifying (e.g., the operation 1210 of FIG. 12), in a displaying area of a display in the wearable device, areas in which each of a plurality of screens is displayed. The method may comprise identifying (e.g., the operation 1220 of FIG. 12), based on a direction of a body part of a user wearing the wearable device that is identified by data of a sensor in the wearable device, a first area among the areas corresponding to the direction. The method may comprise displaying, based on identifying the first area, a first screen corresponding to the first area in a first preset state among distinct states distinguished by whether interaction associated with a screen is permitted, and displaying at least one second screen that is different from the first screen in a second preset state that is different from the first preset state.

For example, the displaying may comprise displaying the at least one second screen in the second preset state in which a rendering of the visual object based on a three dimensional coordinate system in a screen is disabled.

For example, the displaying may comprise executing a first process corresponding to the first screen in the first preset state in which execution of at least one function to interact with the user is permitted, among functions executable by a process corresponding to a screen.

For example, the displaying may comprise executing at least one second process corresponding to the at least one second screen in the second preset state in which execution of the at least one function to interact with the user is ceased.

For example, the method may comprise identifying, among the at least one second screen, a screen displayed to be longer than a preset duration in the second preset state. The method may comprise displaying an image representing the screen in an area among the areas where the identified screen is displayed.

For example, the displaying may comprise identifying, based on a plurality of tags included in a web page included in the first screen, the visual object in a preset type.

For example, the identifying the visual object may comprise identifying at least one tag indicating the visual object in the preset type based on at least one of a tag name of each of the plurality of tags, attributes respectively included in the plurality of tags, or script codes respectively coupled to the plurality of tags.

For example, the identifying the visual object may comprise selecting, based on identifying a preset script code associated with a shader executed by a graphic processing unit (GPU), a tag associated with the preset script code among the plurality of tags as a tag indicating the visual object in the preset type.

For example, the identifying the first area may comprise obtaining information indicating the direction of the body part including an eye of the user using the sensor. The identifying the first area may comprise selecting, based on the direction indicated by the information, and an angle range set by a SOC of a battery in the wearable device, at least one area among the areas.

For example, the selecting may comprise selecting the at least one area among the areas based on the angle range having a size proportional to the SOC.

As described above, a wearable device (e.g., the wearable device 210 of FIG. 2 to FIG. 9, and FIG. 10A to FIG. 10D) according to an embodiment may comprise a display (e.g., the display 530 of FIG. 5), a sensor (e.g., the sensor 540 of FIG. 5), a first processor (e.g., the CPU 512 of FIG. 5) and a second processor (e.g., the GPU 514 of FIG. 5). The first processor may be configured to switch states of a plurality of processes executed by the first processor from a first preset state in which a three dimensional rendering by the second processor is enabled, to a second preset state. The first processor may be configured to identify, while displaying screens respectively corresponding to the plurality of processes through the display, motion towards at least one first screen among the screens using the sensor. The first processor may be configured to switch, based on identifying the motion, a state of at least one first process corresponding to the at least one first screen from the second preset state to the first preset state. The first processor may be configured to execute, based on the at least one first process executed in the first preset state, at least one function for interaction.

For example, the first processor may be configured to display each of the screens in distinct areas in the display.

For example, the first processor may be configured to identify the motion associated with a gaze of a user wearing the wearable device based on data of the sensor.

For example, the first processor may be configured to perform, based on the second preset state in which a rendering based on the second processor is disabled, a rendering with respect to visual objects included in the at least one second screen.

For example, the first processor may be configured to execute, based on the at least one first process executed in the first preset state in which the interaction between the user and the wearable device is permitted, the at least one function for the interaction.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., through a wire), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (A SIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

The device described above may be implemented as a hardware component, a software component, and/or a combination of a hardware component and a software component. For example, the devices and components described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include a magnetic medium such as a hard disk, floppy disk, and magnetic tape, optical recording medium such as a CD-ROM and DVD, magneto-optical medium, such as a floptical disk, and those configured to store program instructions, including ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, other implementations, other embodiments, and those equivalent to the scope of the claims are in the scope of the claims described later.

No claim element is to be construed under the provisions of 35 U.S.C. § 112, sixth paragraph, unless the element is expressly recited using the phrase "means for" or "means."

What is claimed is:

1. A wearable device comprising:

a display;

a sensor;

memory comprising one or more storage media storing instructions; and at least one processor comprising processing circuitry, wherein the instructions, when executed by the at least one processor individually or collectively, cause the wearable device to:

identify, using the sensor, a gaze of a user;

identify whether the gaze of the user is positioned within an execution screen of an application being displayed via the display;

based on the gaze being identified as positioned within the execution screen of the application, display, via the display, the execution screen by:

performing three-dimensional (3D) rendering of one or more of objects having a type corresponding to a preset type included in the execution screen, and performing two-dimensional (2D) rendering of one or more remaining objects among the objects having a type different from the preset type included in the execution screen; and based on the gaze being identified as positioned out of the execution screen of the application, display, via the display, the execution screen by performing the 2D rendering of the objects included in the execution screen.

2. The wearable device of claim 1, wherein the instructions, when executed by the at least one processor individually or collectively, cause the wearable device to:

based on the gaze of the user being identified as moved to out of the execution screen of the application while the execution screen of the application is displayed by performing the 3D rendering of the one or more of the objects, display, via the display, the execution screen of the application by performing the 2D rendering of the objects; and based on the gaze being identified as positioned moved to within the execution screen of the application while the execution screen of the application is displayed by performing the 2D rendering of the objects, display, via the display, the execution screen of the application by:

performing the 3D rendering of the one or more of the objects, and performing the 2D rendering of the one or more remaining objects.

3. The wearable device of claim 1, wherein the instructions, when executed by the at least one processor individually or collectively, cause the wearable device to:

based on the gaze being identified as positioned within the execution screen of the application, display, via the display, the execution screen of the application in which at least one function of the execution screen of the application to interact with the user is permitted.

4. The wearable device of claim 3, wherein the instructions, when executed by the at least one processor individually or collectively, cause the wearable device to:

based on the gaze being identified as positioned out of the execution screen of the application, display, via the display, the execution screen of the application in which the at least one function is ceased.

5. The wearable device of claim 1, wherein the instructions, when executed by the at least one processor individually or collectively, cause the wearable device to:

identify whether a reference time is elapsed from a time point at which the execution screen of the application is displayed by performing the 2D rendering of the objects; and based on identifying that the reference time is elapsed from the time point, display, via the display, an image representing the execution screen of the application.

6. The wearable device of claim 1, wherein the instructions, when executed by the at least one processor individually or collectively, cause the wearable device to:

based on the gaze being identified as positioned within the execution screen of the application, identify the one or more of the objects having a type corresponding to the preset type from among the objects using a plurality of tags in a web page in the execution screen of the application.

7. The wearable device of claim 6, wherein the instructions, when executed by the at least one processor individually or collectively, cause the wearable device to:

identify at least one tag indicating the one or more of the objects, based on at least one of a tag name of each of the plurality of tags, attributes respectively included in the plurality of tags, or script codes respectively coupled to the plurality of tags.

8. The wearable device of claim 6, further comprising another processor different from the at least one processor, wherein the instructions, when executed by the at least one processor individually or collectively, cause the wearable device to:

based on identifying a preset script code associated with a shader executed by the another processor, identify a tag associated with the preset script code among the plurality of tags, as a tag indicating the one or more of the objects.

9. The wearable device of claim 1, further comprising a rechargeable battery, wherein the instructions, when executed by the at least one processor individually or collectively, cause the wearable device to:

obtain, using the sensor, information indicating a direction of the gaze, and based on the direction indicated by the information and an angle range set by a state of charge (SOC) of the rechargeable battery, identify whether the gaze is positioned within the execution screen of the application.

10. The wearable device of claim 9, wherein the instructions, when executed by the at least one processor individually or collectively, cause the wearable device to:

identify the SOC of the rechargeable battery;

based on the SOC being identified as greater than a SOC threshold, identify whether the gaze is positioned within the execution screen of the application based on a first angle range; and based on the SOC being identified as less than the SOC threshold, identify whether the gaze is positioned within the execution screen of the application based on a second angle range that is narrower than the first angle range.

11. A method of a wearable device, the method comprising:

identifying, using a sensor of the wearable device, a gaze of a user;

identifying whether the gaze of the user is positioned within an execution screen of an application being displayed via a display of the wearable device;

based on the gaze being identified as positioned within the execution screen of the application, displaying, via the display, the execution screen by:

performing three-dimensional (3D) rendering of one or more of objects having a type corresponding to a preset type included in the execution screen, and performing two-dimensional (2D) rendering of one or more remaining objects among the objects having a type different from the preset type included in the execution screen; and based on the gaze being identified as positioned out of the execution screen of the application, displaying, via the display, the execution screen by performing the 2D rendering of the objects included in the execution screen.

12. The method of claim 11, further comprising:

based on the gaze of the user being identified as moved to out of the execution screen of the application while the execution screen of the application is displayed by performing the 3D rendering of the one or more of the objects, displaying, via the display, the execution screen of the application by performing the 2D rendering of the objects; and based on the gaze being identified as positioned moved to within the execution screen of the application while the execution screen of the application is displayed by performing the 2D rendering of the objects, displaying, via the display, the execution screen of the application by performing the 3D rendering of the one or more of the objects, and performing the 2D rendering of the one or more remaining objects.

13. The method of claim 11, further comprising:

based on the gaze being identified as positioned within the execution screen of the application, displaying, via the display, the execution screen of the application in which at least one function of the execution screen of the application to interact with the user is permitted.

14. The method of claim 13, further comprising:

based on the gaze being identified as positioned out of the execution screen of the application, displaying, via the display, the execution screen of the application in which the at least one function is ceased.

15. The method of claim 11, further comprising:

identifying whether a reference time is elapsed from a time point at which the execution screen of the application is displayed by performing 2D rendering of the objects; and based on identifying that the reference time is elapsed from the time point, displaying, via the display, an image representing the execution screen of the application.

16. The method of claim 11, further comprising:

based on the gaze being identified as positioned within the execution screen of the application, identifying the one or more of the objects from among the objects having a type corresponding to the preset type using a plurality of tags in a web page in the execution screen of the application.

17. The method of claim 16, further comprising:

identifying at least one tag indicating the one or more of the objects, based on at least one of a tag name of each of the plurality of tags, attributes respectively included in the plurality of tags, or script codes respectively coupled to the plurality of tags.

18. The method of claim 16, further comprising:

based on identifying a preset script code associated with a shader executed by another processor of the wearable device, identifying a tag associated with the preset script code among the plurality of tags, as a tag indicating the one or more of the objects.

19. The method of claim 11, further comprising:

obtaining, using the sensor, information indicating a direction of the gaze, and based on the direction indicated by the information and an angle range set by a state of charge (SOC) of a rechargeable battery of the wearable device, identifying whether the gaze is positioned within the execution screen of the application.

20. The method of claim 19, further comprising:

identifying the SOC of the rechargeable battery;

based on the SOC being identified as greater than a SOC threshold, identifying whether the gaze is positioned within the execution screen of the application based on a first angle range; and based on the SOC being identified as less than the SOC threshold, identifying whether the gaze is positioned within the execution screen of the application based on a second angle range that is narrower than the first angle range.

* * * * *